(12) United States Patent
Richert et al.

(10) Patent No.: US 11,257,197 B2
(45) Date of Patent: Feb. 22, 2022

(54) MAPPING PIPELINE OPTIMIZATION USING AGGREGATED OVERHEAD VIEW RECONSTRUCTION

(71) Applicant: Woven Planet North America, Inc., Los Altos, CA (US)

(72) Inventors: Wilhelm Richert, Feldkirchen (DE); Thomas Schiwietz, Munich (DE)

(73) Assignee: Woven Planet North America, Inc., Los Altos, CA (US)

( * ) Notice: Subject to any disclaimer, the term of this patent is extended or adjusted under 35 U.S.C. 154(b) by 11 days.

(21) Appl. No.: 16/836,803

(22) Filed: Mar. 31, 2020

(65) Prior Publication Data

US 2021/0304380 A1   Sep. 30, 2021

(51) Int. Cl.
*G06T 5/50* (2006.01)
*G06T 1/20* (2006.01)
*G06T 7/73* (2017.01)
*G06T 7/90* (2017.01)

(52) U.S. Cl.
CPC .............. *G06T 5/50* (2013.01); *G06T 1/20* (2013.01); *G06T 7/74* (2017.01); *G06T 7/90* (2017.01)

(58) Field of Classification Search
CPC combination set(s) only.
See application file for complete search history.

(56) References Cited

U.S. PATENT DOCUMENTS

| | | | | |
|---|---|---|---|---|
| 2014/0240501 A1* | 8/2014 | Newman | .................... | G06T 7/77 348/148 |
| 2017/0039765 A1* | 2/2017 | Zhou | .................... | G06T 7/55 |
| 2017/0287170 A1* | 10/2017 | Perona | .................... | G06K 9/0063 |
| 2018/0188026 A1* | 7/2018 | Zhang | .................... | G06T 7/73 |
| 2019/0033459 A1 | 1/2019 | Tisdale et al. | | |
| 2019/0050648 A1 | 2/2019 | Stojanovic et al. | | |
| 2019/0213756 A1 | 7/2019 | Chang et al. | | |
| 2020/0013154 A1 | 1/2020 | Jang | | |
| 2020/0309541 A1* | 10/2020 | Lavy | .................... | G06K 9/6256 |

(Continued)

OTHER PUBLICATIONS

International Searching Authority, International Search Report and Written Opinion, PCT/US2021/025237, dated Jul. 13, 2021.

(Continued)

*Primary Examiner* — Omar S Ismail

(74) *Attorney, Agent, or Firm* — Christopher G. Darrow; Darrow Mustafa PC

(57) ABSTRACT

Examples disclosed herein may involve (i) obtaining an aggregated overhead view image of a geographical area that has been generated by a pipeline for generating aggregated overhead view images, the geographical area comprising a plurality of regions, where the aggregated overhead view image is generated from aggregating pixel values from a plurality of source images of the geographical area, (ii) generating one or more reprojection images of one or more of the regions of the geographic area from the aggregated overhead view image, (iii) identifying, from the plurality of source images, one or more source images that capture the one or more regions of the geographical area, (iv) calculating one or more differences between the identified one or more source images and the one or more reprojection images, and (v) determining one or more error corrections to be applied to the pipeline for generating overhead view images.

17 Claims, 20 Drawing Sheets

(56) References Cited

U.S. PATENT DOCUMENTS

2020/0364898 A1* 11/2020 Lawlor .................. G06T 7/521
2020/0372623 A1* 11/2020 Lawlor ................ G06T 7/0002

OTHER PUBLICATIONS

Regmi et al., "Cross-view image synthesis using geometry-guided conditional GANs", found at: arXiv:1808.05469v1 [cs.CV] Aug. 14, 2018.

* cited by examiner

410 Application of segmentation masks

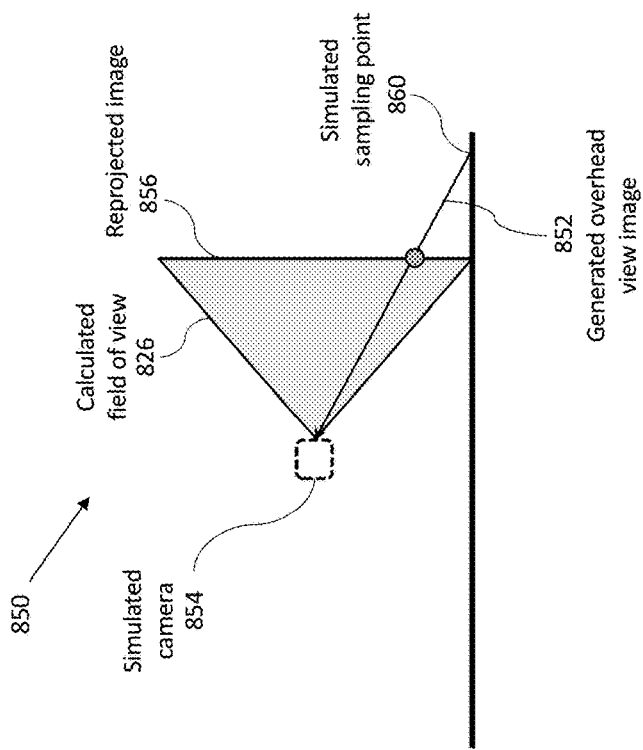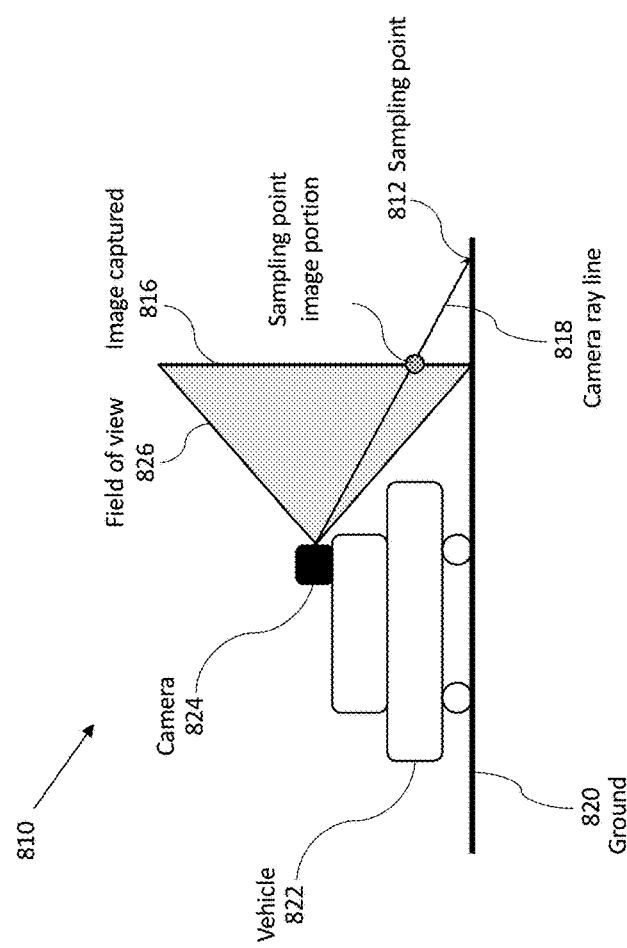
FIG. 8

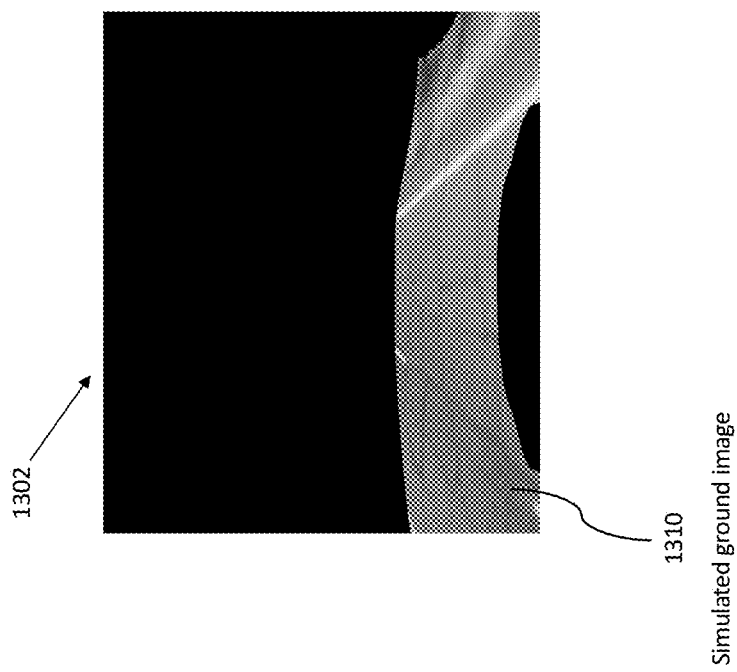
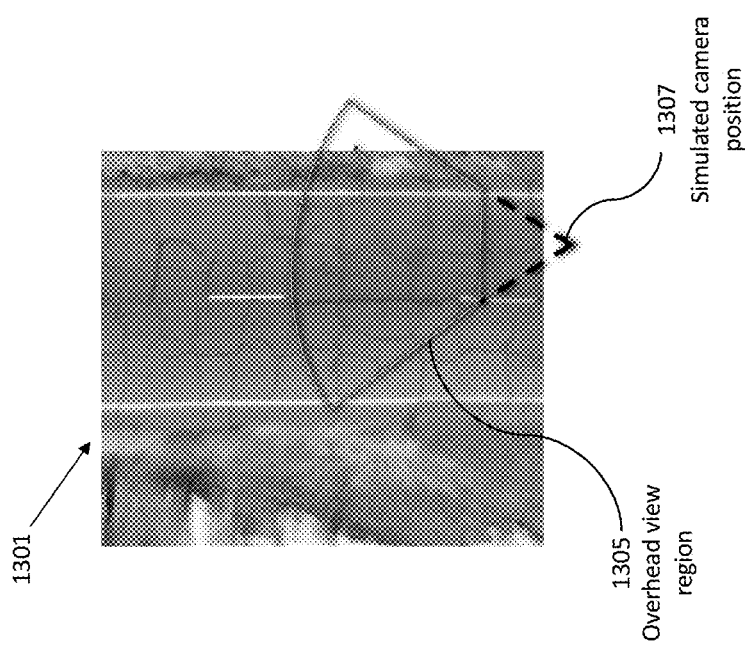
FIG. 13

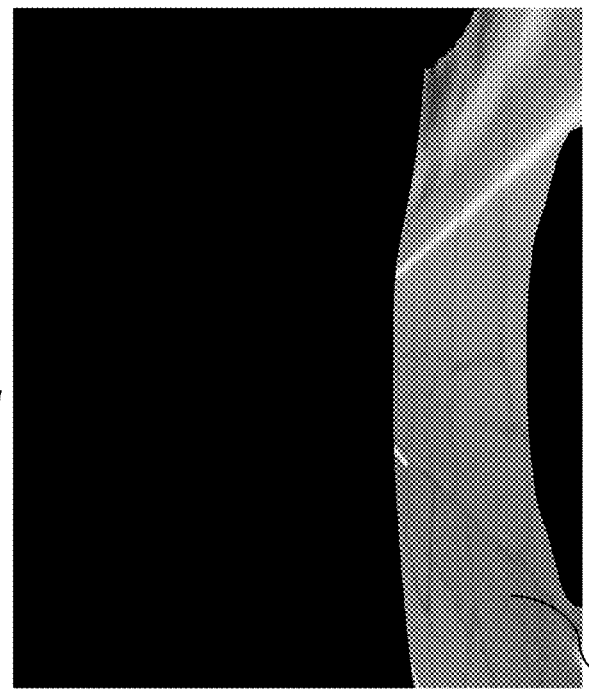
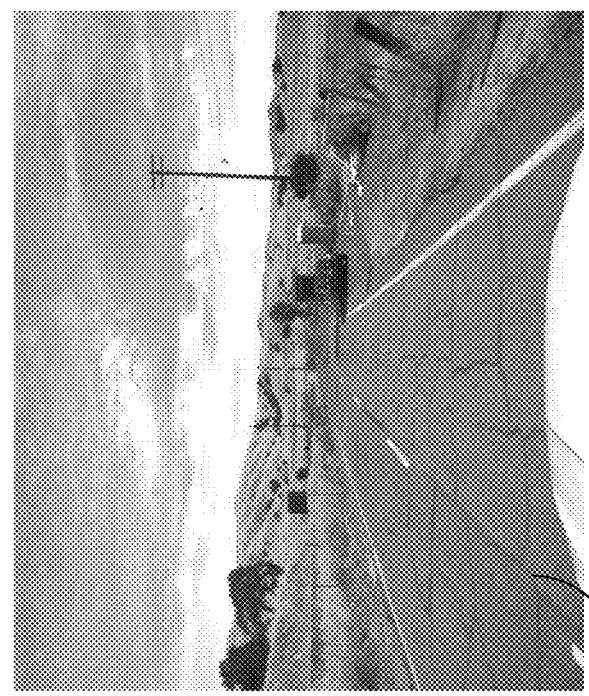
FIG. 14

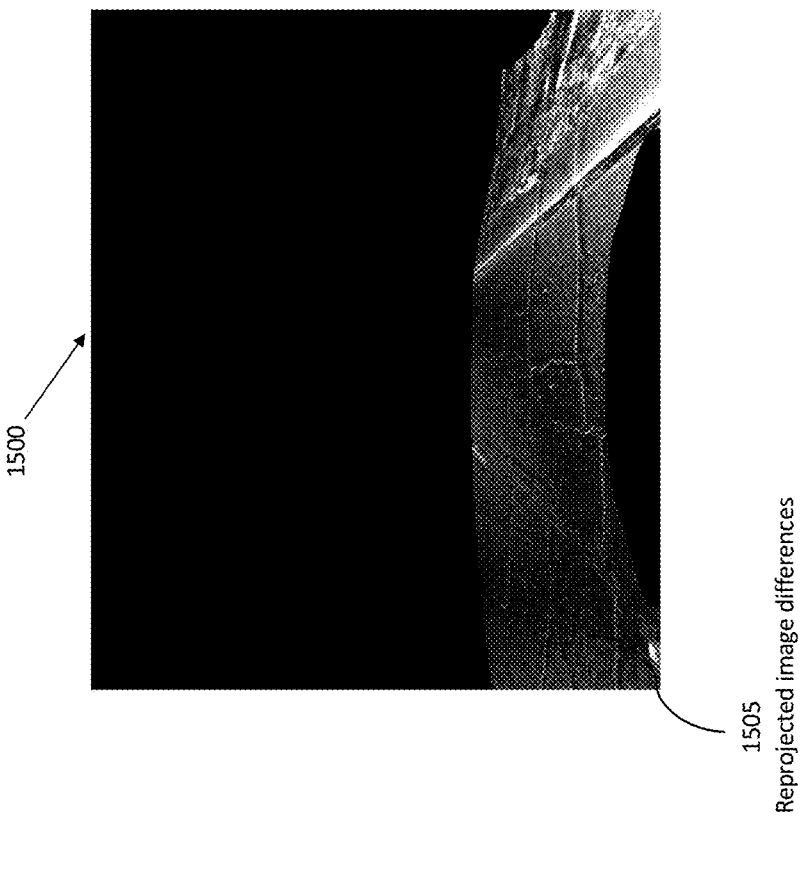
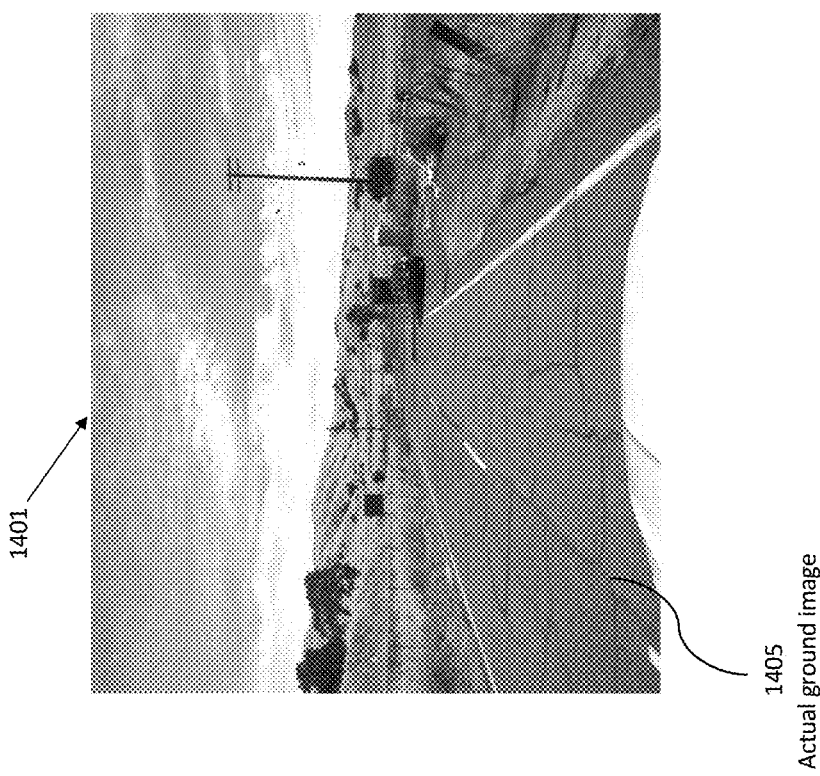
FIG. 15

MAPPING PIPELINE OPTIMIZATION USING AGGREGATED OVERHEAD VIEW RECONSTRUCTION

CROSS REFERENCE TO RELATED APPLICATIONS

The present application hereby incorporates each of the following U.S. patent applications by reference: (i) U.S. patent application Ser. No. 16/731,902, which was filed on Dec. 31, 2019 and is entitled "Overhead View Image Generation," (ii) U.S. patent application Ser. No. 16/731,933, which was filed on Dec. 31, 2019 and is entitled "Map Feature Extraction Using Overhead View Images," (iii) U.S. patent application Ser. No. 16/731,951, which was filed on Dec. 31, 2019 and is entitled "Improvements to Overhead View Image Generation," and (iv) U.S. patent application Ser. No. 16/731,972, which was filed on Dec. 31, 2019 and is entitled "Generating Training Data from Overhead View Images."

BACKGROUND

It is well-known to provide overhead view maps. Methods of providing maps having an overhead view include methods of cartography, for example, street atlas maps, capturing images such as satellite images and using aerial photography. These methods are used to provide a view of the earth from above and can be used in, for example, geographical studies, such as to survey areas of land. These methods can provide digital images, but these images are not captured at a resolution high enough to enable vital mapping data such as map semantics and/or map features to be extracted.

Aerial images are typically generated using manual photography and do not provide true orthographic or overhead views. Satellite imagery has often been used for mapping, environmental monitoring, and archaeological surveys but these images have to be captured by deploying and/or using expensive satellites which continuously orbit the earth. Satellite images, however, can be geometrically distorted due to the camera lens' properties and undesirable movement of the satellites or due to environmental effects. This can provide inaccurate images of the real-world which often hinders their application for mapping purposes. Additionally, satellite images are captured from imaging devices (as flat two-dimensional images) at a significant distance above the ground surface, and so the images usually include a number of occlusions which block the view of the ground from overhead, such as trees and bridges. The image quality is also subject to various environmental factors which can hinder their use for mapping applications.

It is often difficult to accurately and efficiently produce realistic and content-rich overhead view maps when combining satellite or aerial images with cartographic maps since the two will not always align. Additionally, the maps that are created give no real-world bearing on the surface elevation of the ground and are therefore not suitable for all applications.

SUMMARY

In one aspect, the disclosed technology may take the form of a method that involves (i) obtaining an aggregated overhead view image of a geographical area that has been generated by a pipeline for generating aggregated overhead view images, the geographical area comprising a plurality of regions, where the aggregated overhead view image is generated from aggregating pixel values from a plurality of source images of the geographical area, (ii) generating one or more reprojection images of one or more of the regions of the geographic area from the aggregated overhead view image, (iii) identifying, from the plurality of source images, one or more source images that capture the one or more regions of the geographical area, (iv) calculating one or more differences between the identified one or more source images and the one or more reprojection images, and (v) based on the calculated one or more differences, determining one or more error corrections to be applied to the pipeline for generating overhead view images.

In example embodiments, the plurality of source images from which the aggregated overhead view image is generated may comprise one or more source images captured at a substantially ground-level view.

Further, in example embodiments, the one or more reprojection images may be generated at a substantially ground-level view.

Still further, in example embodiments, the function of calculating one or more differences may comprise an analysis of one or more of: color space or a distance function.

Further yet, in example embodiments, the one or more error corrections may comprise one or more modifications to one or more parameters utilized by the pipeline to generate aggregated overhead view images.

Further, in example embodiments, the function of determining one or more error corrections may involve (i) performing an iterative optimization process to identify a given set of parameters that, when utilized by the pipeline to re-generate the aggregated overhead view image, minimizes a reprojection error, (ii) identifying a difference between an original set of parameters utilized by the pipeline and the given set of parameters, and (iii) using the identified difference as a basis for determining the one or more error corrections.

Still further, in example embodiments, the one or more error corrections may comprise a modification to (i) one or more parameters related to capture of image data utilized by the pipeline to generate aggregated overhead view images, (ii) one or more parameters related to capture of point cloud data utilized by the pipeline to generate aggregated overhead view images, (iii) one or more parameters related to calibration or synchronization of sensor units utilized by the pipeline to generate aggregated overhead view images, (iv) one or more parameters related to the generation of the simultaneous localization and mapping (SLAM) information utilized by the pipeline to generate aggregated overhead view images, (v) one or more parameters related to one or more processing techniques utilized by the pipeline to generate aggregated overhead view images.

Further yet, in example embodiments, the one or more processing techniques utilized by the pipeline to generate aggregated overhead view images may comprise a segmentation technique.

Further, in example embodiments, the function of identifying the one or more source images may involve one or more of: (i) filtering out one or more of the plurality of source images taken at a distance greater than a predetermined distance, (ii) filtering out a portion of one or more of the plurality of source images containing over a predetermined amount of shadow, (iii) filtering out one or more of the plurality of source images below a predetermined quality threshold, (iv) filtering out one or more of the plurality of source images taken within a predetermined time window, (v) filtering out one or more of the plurality of source images taken from a given camera, or (vi) filtering out pixels that are masked out by one or more segmentation masks. In these example embodiments, the one or more segmentation masks may comprise a mask corresponding to one or both of a road surface or a vehicle mask.

Still further, in example embodiments, the function of calculating the one or more differences between the identified one or more source images and the one or more reprojection images may involve (i) summing one or more difference values per pixel and (ii) outputting one or more error metrics. In this example embodiments, pixels may only be considered in a predetermined limit around the edges of the identified one or more source images, and the predetermined limit may comprise a predetermined size of pixel grid.

Further yet, in example embodiments, the method may additionally involve determining an image quality metric per pixel with respect to the aggregated overhead view image. In these example embodiments, the image quality metric may be used to trigger the generating of the one or more reprojection images.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which:

FIG. 8 shows reprojected images from generated overhead view data;

FIG. 9 shows an illustration of a section of a reprojected view image including the erroneous region of the generated overhead view image from a pose similar to which the original data was captured from;

FIG. 13 shows a generated overhead view image and a reprojected image generated from a section of the generated overhead view image;

FIG. 14 shows an actual image gathered by a vehicle camera versus a reprojected image of the same ground area from the generated overhead view image;

FIG. 15 shows the same actual image beside the calculated difference image between the actual reprojected image;

Figure 1:
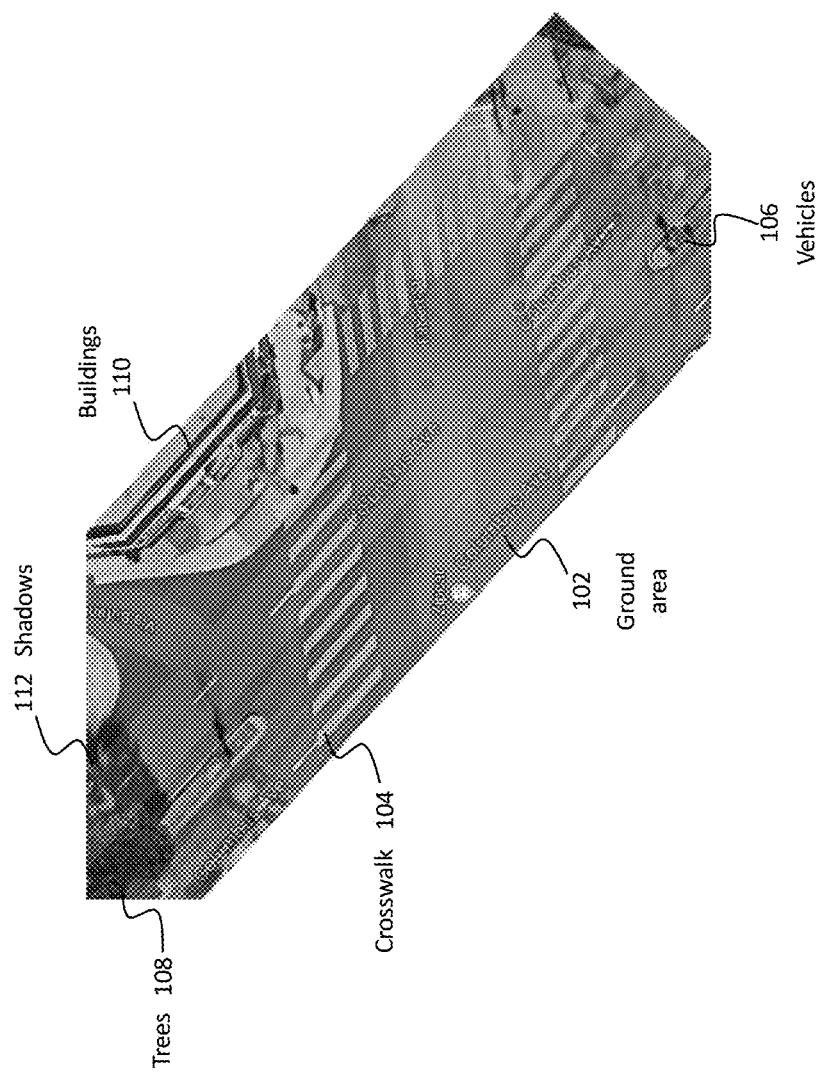
FIG. 1 shows a traditional satellite image of a geographical area which includes occlusions to the ground area such as vehicles, buildings, and trees.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Traditional overhead view maps using aerial photography, satellite imagery or cartography do not accurately capture ground topography, nor do they accurately capture the detail of the ground in mapped environments.

FIG. 1 shows a traditional satellite image of a ground area 102 showing an overhead view, otherwise described as a top down view, "bird's eye view" or plan view (with semantic map features overlaid). Such images of the real world inevitably include unwanted static or transient features or objects, such as vehicles 106, pedestrians, animals, artefacts, duplicated structures, clouds, trees 108, crosswalks 104, buildings 110, and shadows 112, which occlude the details of the ground in the image. The various occlusions mentioned above are also obstacles in determining map semantics, such as road signs or road markings, as they prevent imaging devices from fully capturing the entire area and thus the image data is inaccurate or incomplete thus the map semantics may be partially or entirely occluded. Due to the constant changes in the real world, such as changing environmental conditions, construction work, movement of people, and road traffic, for example, these occlusions are in most situations unavoidable when using traditional methods of map data collection. Thus, the occlusions in the image data cause errors or omissions in the process of extracting map data from the image data such as determining whether an area is a drivable area for a vehicle, which is important for autonomous vehicles.

Additionally, current overhead view mapping techniques do not typically generate sufficiently high resolution or sharp images that can be used for some applications, such as autonomous vehicles, that require accurate precision. Thus, it would be advantageous to generate sharp, dense, and context-rich overhead view images which can depict the ground area of a geographical area with geometric accuracy. Further applications of overhead view images may include, however are not limited to, top down labelling of map semantics (such as lane boundaries) as additional map layers, and training and/or using machine learning techniques for detecting, extracting, and/or correcting artefacts or occlusions.

Referring to FIGS. 2 to 18, example embodiments will be described relating to a method of determining one or more errors in an aggregated overhead view image of a geographical area and then using the one or more errors as a basis for determining one or more "error corrections" that can be applied to one or more parameters of one or more aspects of a pipeline for generating overhead view images (e.g., parameters related to capture of image data, capture of point cloud data, generation of simultaneous localization and mapping (SLAM) information, processing of captured sensor data, etc.).

Example embodiments described herein may involve generation of an aggregated overhead view image of a geographic area by using ground map data in combination with image data, which may involve aggregating pixel values from a plurality of source images of the geographical area. Overhead view images generated in this way can provide various advantages such as generating images that accurately align with simultaneous localization and mapping (SLAM). The methods described can also generate faster and more efficient image updates, compared to aerial photography, due to the use of ground vehicles or (substantially) ground level image sensors to obtain image data rather than aerial imagery, and can also generate images which do not include unwanted features that can occlude the drivable surface/ground as observed from above. Using the described methods, for example, it can be possible to generate images of the drivable surface inside tunnels to provide more complete top down or overhead views of an environment to be mapped, which is not possible with the traditional methods mentioned above.

Example embodiments seek to generate aggregated overhead view images of the ground using a ground map of filtered point cloud data. Further, the overhead view images seek to represent the real-world surface of geographical areas along with relevant metadata. Although the images of the area/environment can be captured using vehicles equipped with image sensors or image sensor arrays, the raw images may also be obtained by an image sensor in any form, for example, a smartphone or a digital camera. The image data can also be accompanied by image metadata, including but not limited to, timestamp information, pose data, Inertial Measurement Unit (IMU) data, and other corresponding sensor data, which can be transmitted to a network and/or other computer systems. Image data can be obtained as sequential image data or data collected over one or more trajectories, however, not every image collected is necessary or useful for overhead view image generation due to occlusions, for example.

Figure 2:
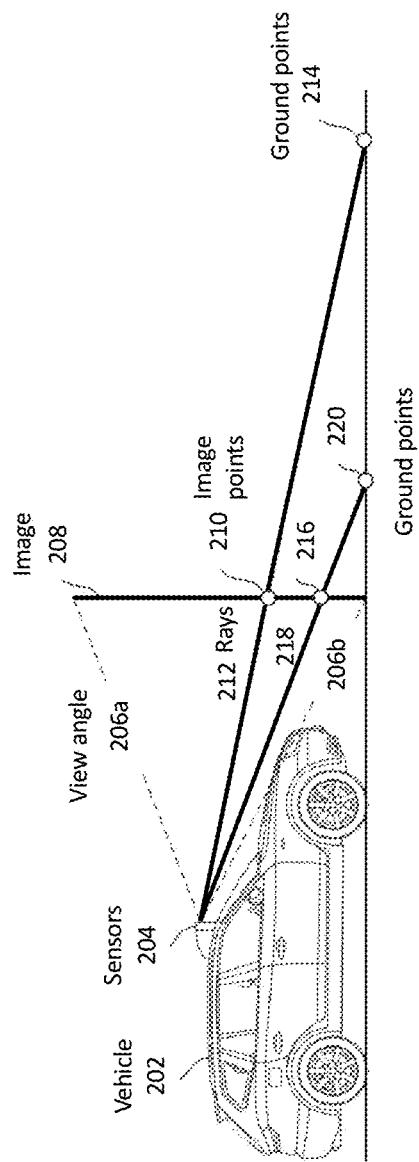
FIGS. 2 and 3 both illustrate a typical vehicle that can capture both LiDAR and image data as it traverses a map, showing the image capture field of view and how the LiDAR captures relevant ground map data.
Figure 3:
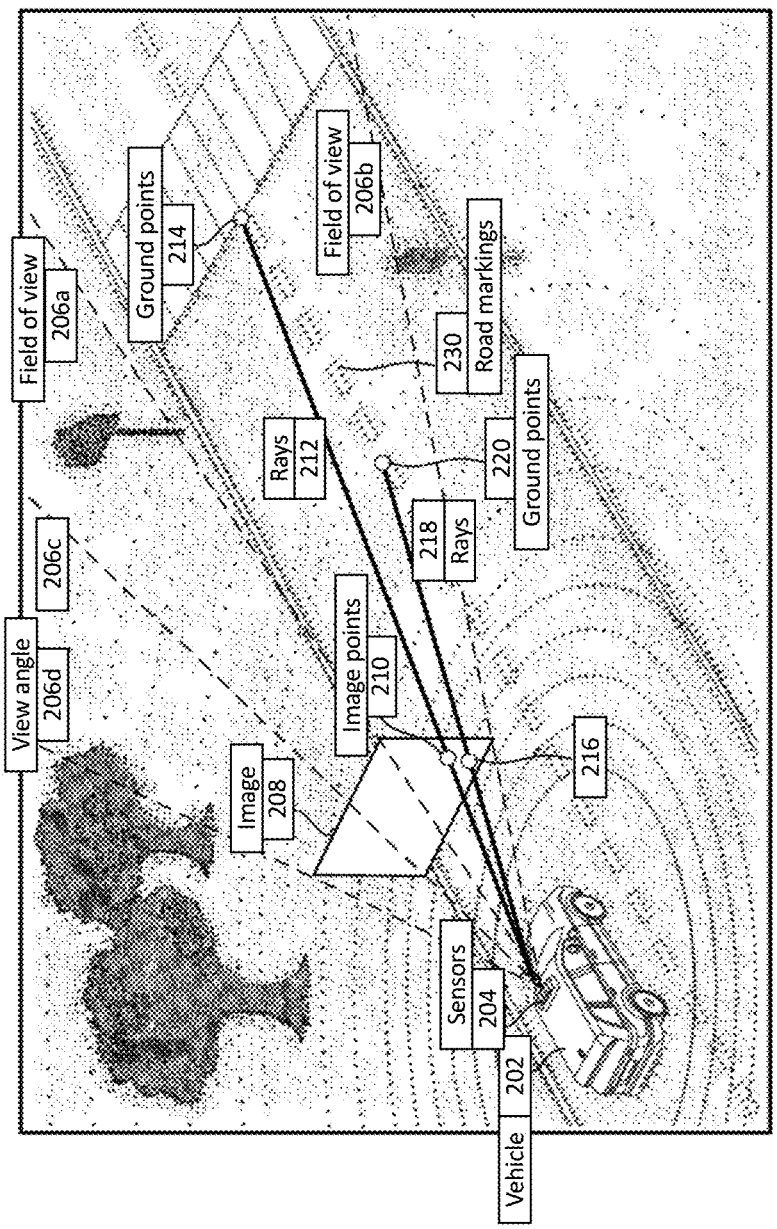

FIGS. 2 and 3 demonstrate an example scenario of gathering mapping data of an area using a vehicle equipped with one or more sensors. In this example, both image data and Light Detection and Ranging (LiDAR) data are gathered by the vehicle. In other embodiments, only image data may be collected. In other embodiments, 360° image data is collected using multiple cameras mounted on the vehicle. FIG. 2A specifically depicts the example scenario from a side plan view, for simplicity, while FIG. 2B depicts the example scenario from a three-dimensional perspective view for greater detail, and in use gathering the data.

FIGS. 2 and 3 depict a vehicle 202, having an imaging and LiDAR sensors 204 used respectively to capture an image 208 of the environment and a point cloud of the environment which can be localized through the use of SLAM and be used to generate ground map data. Specifically, for the imaging sensor 204 in FIGS. 2-3, the field of view is demonstrated using dotted lines 206a, 206b, 206c, and 206d (lines 206c and 206d are only shown in FIG. 3). The dotted lines 206a-d also define a view represented by a frustum for the image 208. In some embodiments the camera direction, position, and orientation or pose are known along with a timestamp of when the image 208 was captured. In further embodiments, the ground map can be generated using an alternate and/or secondary sensor to LiDAR which can be RADAR, SONAR or stereo camera, for example.

The perspective view of FIG. 3 shows that the sensor data is gathered at substantially ground level, or substantially parallel to the ground. For example, the images are captured by sensors attached to a vehicle or mounted within a vehicle. As such, "ground level" may include some feet or yards elevated from the ground but captured from the point of view of a platform, person, or vehicle moving through the mapped area. Additionally, in use, the sensor data can also be used to label semantic map features such as road markings 230.

Example embodiments can be dependent on the calibration and/or synchronization of sensors which are provided on, or within, the vehicle. In some embodiments, at least two sensors are used to capture data of the environment or geographic area including, but not limited to, an image sensor and a LiDAR sensor. Calibration of sensor data can assist to filter out irrelevant LiDAR points, for example, by removing points that are located on the vehicles themselves or points that are not seen in corresponding camera images. In some embodiments, the sensors described herein may be pre-calibrated as would be understood by a person skilled in the art. Optionally, the ground map data can be generated using any one or any combination of LiDAR, RADAR, SONAR or stereo cameras. In some embodiments, a ground map domain that has greater coverage of geographical areas is used compared to traditional methods of ground map generation.

In some embodiments, knowing which points within the point cloud represent the ground, an algorithm can be used to infer that certain portions of the ground map, such as gaps or occlusions in the point cloud data, require reconstruction and/or that portions of the ground map have or should have assigned values. An assigned value may be indicative of the height of point cloud data. In this way, the ground map comprises an indication of elevation variances of a ground surface of the geographical area. Such information can be used to detect LiDAR sensor errors for further calibration, for example. The ground map usually covers at least the entire width of the drivable surface and in example embodiments, the domain of the ground map can be determined from point clouds filtered by segmentation.

Figure 4A:
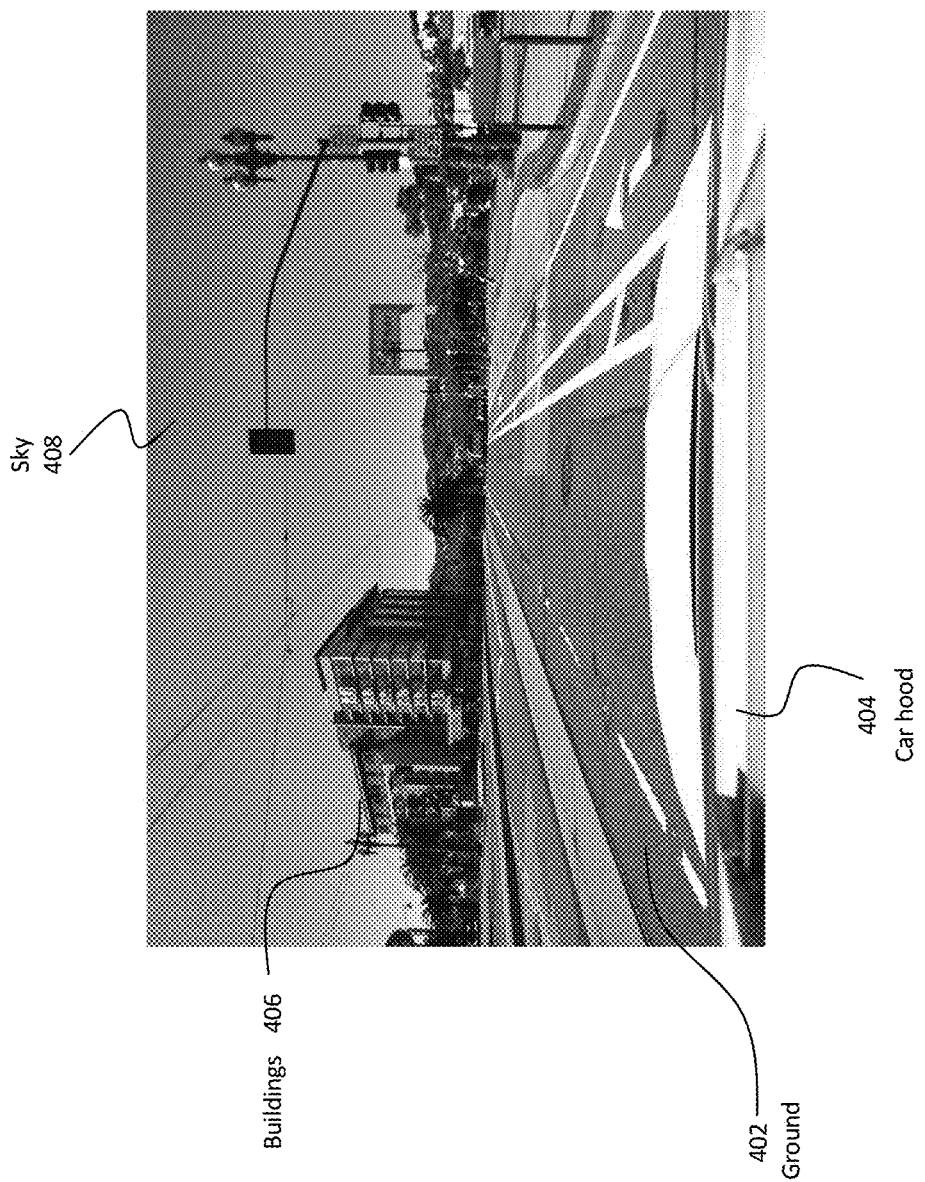
FIGS. 4A, 4B, and 4C show a camera image captured by such a vehicle in a real-world situation, and then demonstrating the generation and use of segmentation masks on this camera image to extract just the relevant image data from the camera image to isolate the visible ground area of the image data captured.

FIG. 4A illustrates an example of a typical image captured by a front facing camera of the vehicle shown in FIG. 2 or 3. As shown in FIG. 4A, the field of view of the images captured by the image sensor includes the entire real-world environment, for example, the image includes the car hood/bonnet 404, the sky 408, buildings 406, etc., in addition to the ground 402.

Figure 4B:
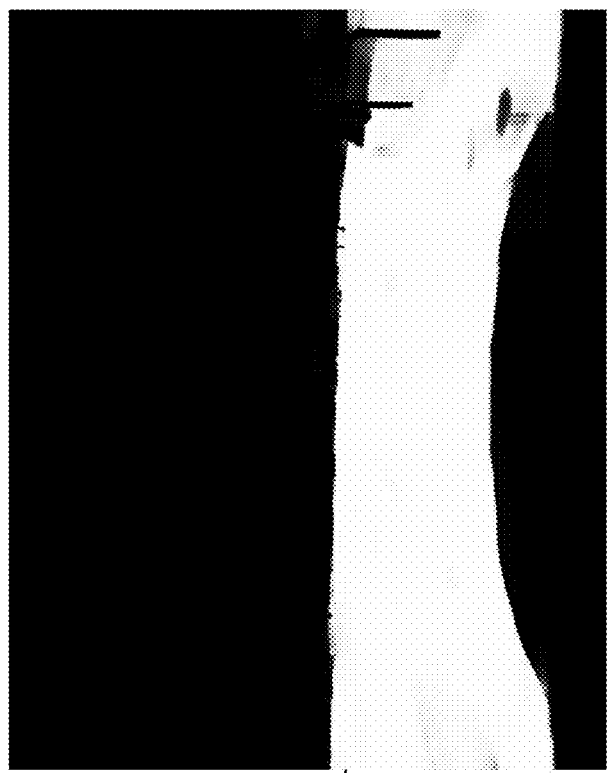

To create overhead view images from this image data, segmentation masks may be used to isolate the ground in the images so only image data of the ground is used to generate the overhead view image. For instance, as depicted in FIG. 4B, in some embodiments, segmentation masks 410 can be trained and applied to different regions of the images in order to isolate relevant input data for overhead view image generation. Segmentation masks 410 can be applied to, for example, pedestrian path areas, road markings, road signs, crosswalks, solid and dashed lines, text on the ground, and yield lines. The segmentation masks 410 are used to filter out all features or occlusions which are unnecessary for generating overhead view images or that are unwanted in such images. The ground can be segmented into both drivable and non-drivable zones, but both may be shown in the generated overhead view image. In some embodiments, using image segmentation, only the road surface (otherwise described as the drivable area) is extracted. In some embodiments, segmentation of other ground or geographical features can also be applied such as for road markings and crosswalks for example as well as sidewalks and zones which are non-drivable areas of the ground.

Figure 4C:
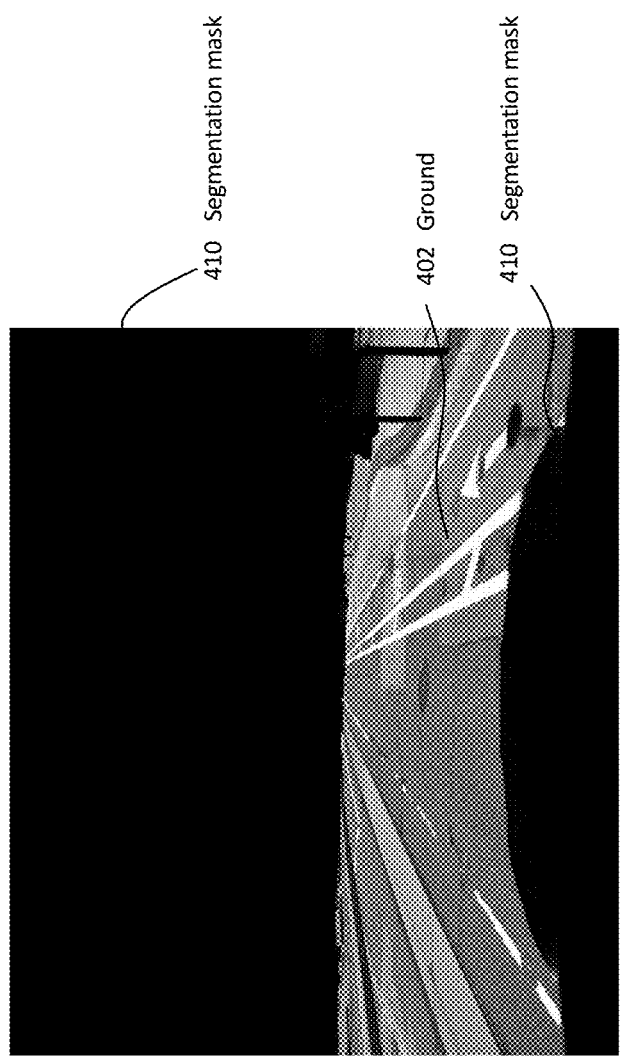

FIG. 4C illustrates the results of segmenting an input image to isolate the ground within each captured image. Applying one or more segmentation masks to images such that only a portion of the image is retained, specifically of the ground area of the image, can prevent irrelevant data being incorporated in the aggregated overhead view images. For example, as shown in FIG. 4C, segmentation masks may be applied to the vehicle, landmarks/buildings, and the sky whilst retaining the drivable and non-drivable portions of the ground area comprising road markings, road lanes and sidewalks visible in the image obtained. By retaining only image data that is used to generate the overhead view images from the captured images, the clarity and overall quality of the aggregated overhead view images can be improved significantly.

In addition to variable image masks, some embodiments can implement tools that allow the use of static image mask for each imaging device. This is particularly useful where each imaging device captures one or more sequences of data collects. For example, parts of the vehicle exterior may visible on in all images that belong to a sequence of collects, which image portions are not needed for generating the overhead view images.

In example embodiments, as an alternate image segmentation method, and with reference to FIG. 3, the number of ground points and non-ground points in each image can be identified and classified through the assessment of characteristics found within the image data. By extrapolation of the rays 212, 218 which correspond to certain points 210 and 216 of the image 208 in FIG. 2, it can be seen that certain points 214 and 220 on the ground are where these extrapolated rays reach, and thus the LiDAR points corresponding to the points in the image 208, 210 and 216, are identified. In this way, the images or portions of the images can be correlated with the ground map or point cloud data.

In generating an overhead-view image, the ground area of the images used for overhead-view image generation can be divided into two-dimensional sections or points, described herein as sampling points, cells, pixels or patches. Each sampling point is associated with a portion of the point cloud data of the ground map. Optionally, or additionally, the raw image or the ground map can be divided into sections of the geographic area based on a global positioning system (GPS) or other coordinate scale. Dividing the ground map into a plurality of sampling points comprises dividing the ground map into any one or any combination of: square grids, tiles, and/or quadtrees and/or hierarchical spatial data structures.

In example embodiments, the color of each of the patches of the aggregated overhead-view image can be determined by determining a correlation between the sampling points of the ground area and the color of each sampling point captured by one or more of the plurality of images including a view of the respective sampling point. For example, the correlation can be a determined two-dimensional coordinate in an image (or alternatively a determined area of an image) corresponding to a three-dimensional coordinate of the ground map. In this way, each sampling point of the ground area is queried against all images in which each point of the ground map is visible and the relevant pixels within such images are aggregated together in order to determine a color for each sampling point of the ground area, which is used as the color of the corresponding patch of the aggregated overhead-view image. Although a color can be determined for each patch based on one camera view image, in example embodiments the color is determined for each of the sampling points from the correlated areas of multiple images. Optionally, the color can be determined for at least one pixel of a portion of a camera image that is not masked out by any segmentation. However, in some embodiments, the color for each of the sampling points can be determined from the correlating areas of multiple images, and more specifically from the relevant pixels of portions of camera images that are not masked through segmentation. In some embodiments, a median or appropriate algorithm may be used to determine the color for each patch.

Although an overhead view image can be generated using images obtained over a single trajectory, it may not be possible to generate a complete overhead view image due to gaps where there are occlusions between the camera sensors and the sampling points, for example. Therefore, in some embodiments, it can be computationally efficient to load or generate the overhead view image only when sufficient data is obtained for each scene of the environment to be mapped in order to reduce costly iterative computation and processing. In example embodiments, all camera images that potentially include within their field of view each sampling point are determined for each sampling point. Thus, in example embodiments, the quality of the overhead view image can be improved with more collects at the same location or of the same geographic area. In some embodiments, typically five to ten data collects, or data streams, are collected.

Figure 5:
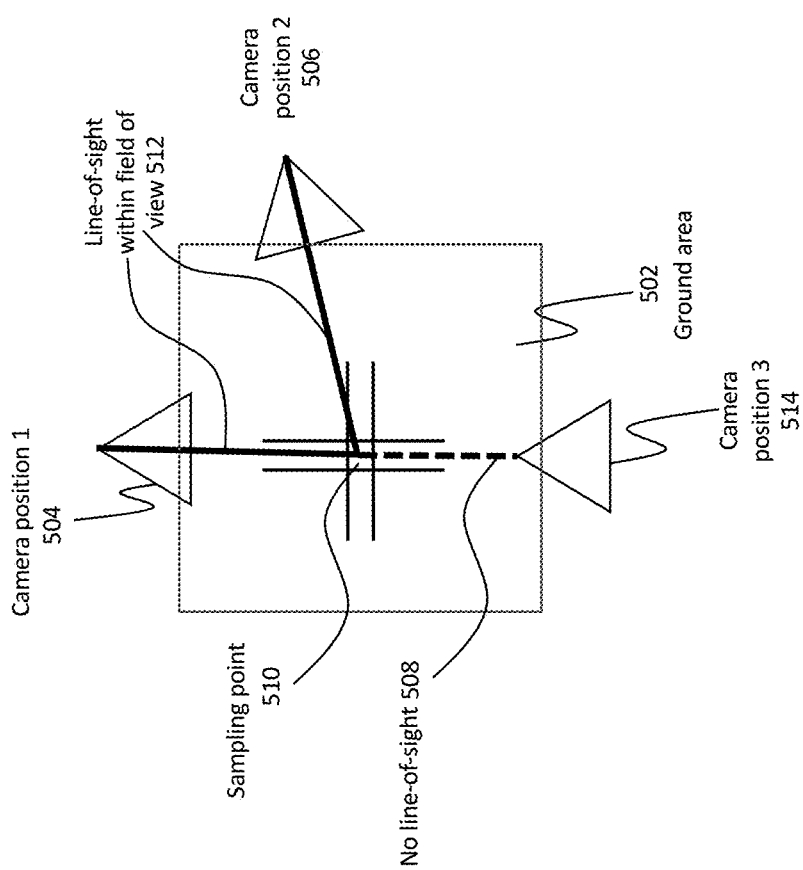
FIG. 5 illustrates determining the relevant images captured of the environment along one or more trajectories for a sampling point in the environment.

In example embodiments, the process of selection of which of the input images represent each sampling point will now be described with reference to FIG. 5, which depicts two trajectories viewing a single sampling point 510 on the ground area 502. In example embodiments, the exact field of view ray, or image rays, for each image to each sampling point is computed so that each sampling point can be associated with each image that includes that sampling point in its field of view. The image view rays 508, 512 are computed from the sampling point 510 to each of the camera positions 504, 506, 514 as depicted in FIG. 5. To illustrate an example of multiple vehicle trajectories or multiple data collects along different trajectories, FIG. 5 illustrates image sensor positions along two different trajectories. FIG. 5 shows the ground area 502, multiple camera frustums 504, 506, 514 illustrating the field of view of each camera, and the line of sight of each of the camera field of views from the sampling point 510 to the cameras 504, 506, 514. Camera positions 1 and 3 (504 and 514 respectively) represent an image sensor moving along a first trajectory and camera position 2 506 represents an image sensor traversing along a second, different, trajectory. In this scenario, only images captured at positions 1 and 2 (504 and 506 respectively) will include the area of the environment corresponding to the ground map sampling point 510, due to the visibility of the sampling point 510 within the field of views of cameras at positions 1 and 2 by the line of sights 512, and thus will be used to generate the overhead view image. It is shown in FIG. 5 that the field of view of camera position 3 514 does not have a line of sight 508 towards the sampling point 510 and therefore cannot be incorporated into the generation of the overhead view image as it is not visible in its field of view.

Figure 6:
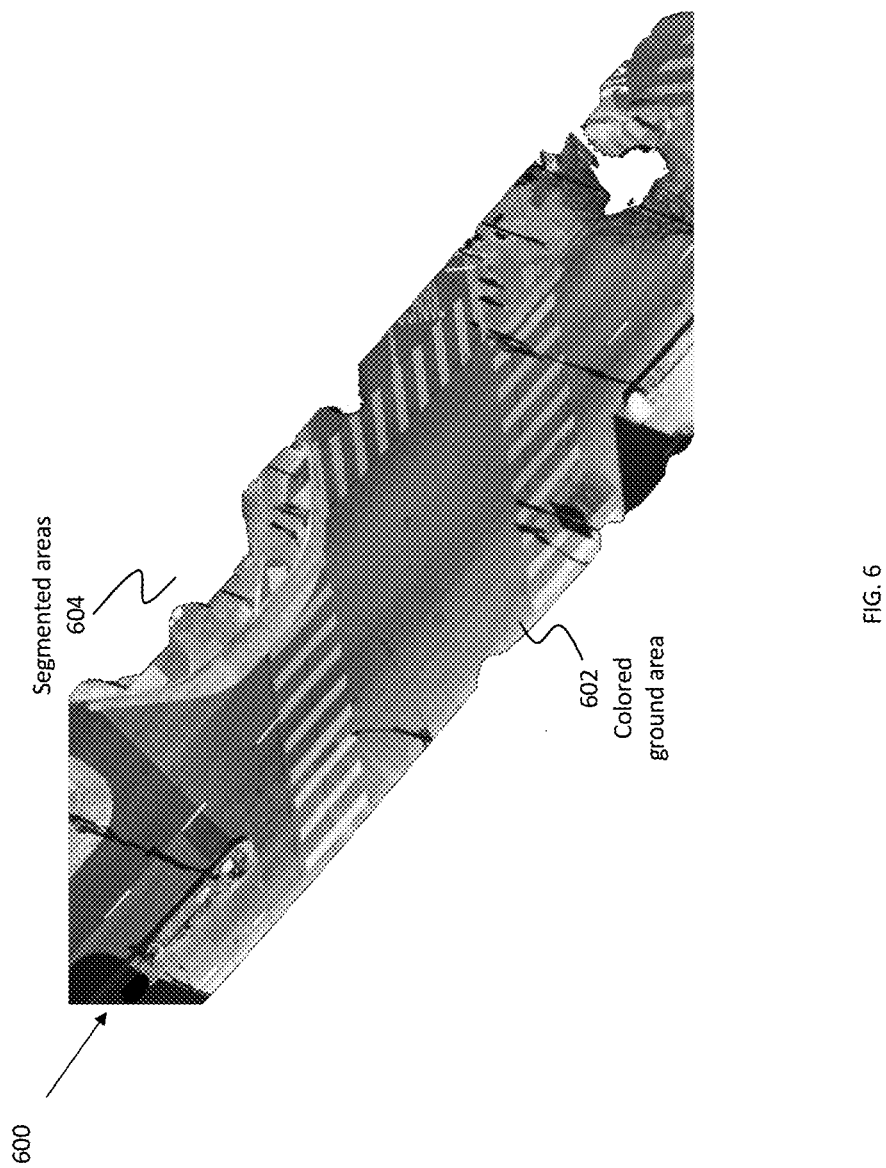
FIG. 6 shows an overhead view image generated using ground map data and image data and illustrating the same geographical area as shown in FIG. 1.

FIG. 6 shows an overhead view image 600, generated in the example embodiment, of the same geographical area depicted in FIG. 1. This illustration shows a colored ground area 602 excluding the segmented areas 604 determined not to be ground. Particularly, example embodiments seek to generate content rich overhead view images of geographical areas by building on top of ground map data, which typically provides a representation of the surface topology over an area, and incorporating colors for each patch of the aggregated overhead view image determined from image data for each associated sampling point of the ground area from limited field of view images captured of the sampling points. This results in higher resolution overhead view images being generated without, or with substantially fewer, occlusions compared to existing satellite or other aerial view images. Specifically, FIG. 6 shows an aggregated overhead view image of the ground surface 602 which clearly includes all the road markings and significantly less interference caused by trees, street furniture, and other occlusions. Further details regarding possible techniques for generating an aggregated overhead view image are described in U.S. patent application Ser. Nos. 16/731,902, 16/731,933, 16/731,951, and 16/731,972 which are incorporated herein in their entirety.

While an aggregated overhead view image generated in the manner described above provides several advantages over overhead view images generated using previous techniques (e.g., techniques that use aerial photography, satellite imagery or cartography), it is possible that such an aggregated overhead view image could include errors. These errors could take various forms, examples of which include duplicated structures, blurriness, distortion, shadows, and/or errant artifacts (e.g., semi-circular artifacts caused by presence of a vehicle roof/hood), among other possibilities.

Further, there could be many different causes for these errors. For instance, as one possibility, the errors that are included in an aggregated overhead view image could be the result of some aspect of the parameters that were used during generation of the overhead view image, such as one or more parameters related to the capture of the image data used to generate overhead view image (e.g., field of view, resolution, capture rate, shutter speed, white balance, etc.), one or more parameters related to the capture of the point cloud data used to generate overhead view image (e.g., field of view, capture rate, point density, etc.), one or more parameters related to the calibration and/or synchronization of different sensor units at a vehicle, one or more parameters related to the generation of the SLAM information that is used during generation of the overhead view image (e.g., the particular variant of SLAM technology used), and/or one or more parameters related to the particular processing techniques (e.g., segmentation techniques, projection techniques, filtering techniques, etc.) that are applied to the sensor data during generation of the overhead view image, among other possibilities.

In order to correct for these errors, disclosed herein is a technique for identifying one or more errors in a "reference" overhead view image that has been generated by a particular pipeline for generating overhead view images (which may comprise the functions described above) and then using the identified one or more errors as a basis for determining one or more "error corrections" that are to be applied to the parameters used by the pipeline during generation of overhead view images. These one or more error corrections could take any of various forms, examples of which may include a modification to one or more of the parameters related to the capture of the image data used to generate overhead view image, a modification to one or more of the parameters related to the capture of the point cloud data used to generate overhead view image, a modification to one or more of the parameters related to the calibration and/or synchronization of different sensor units at a vehicle, a modification to one or more of the parameters related to the generation of the SLAM information that is used during generation of the overhead view image, and/or a modification to one or more of the parameters related to the particular processing techniques that are applied to the sensor data during generation of the overhead view image, among other possibilities. In this way, the disclosed technique may improve the quality of the overhead view images generated by the pipeline such that future overhead view images generated by the pipeline include a lesser extent of errors.

Figure 7:
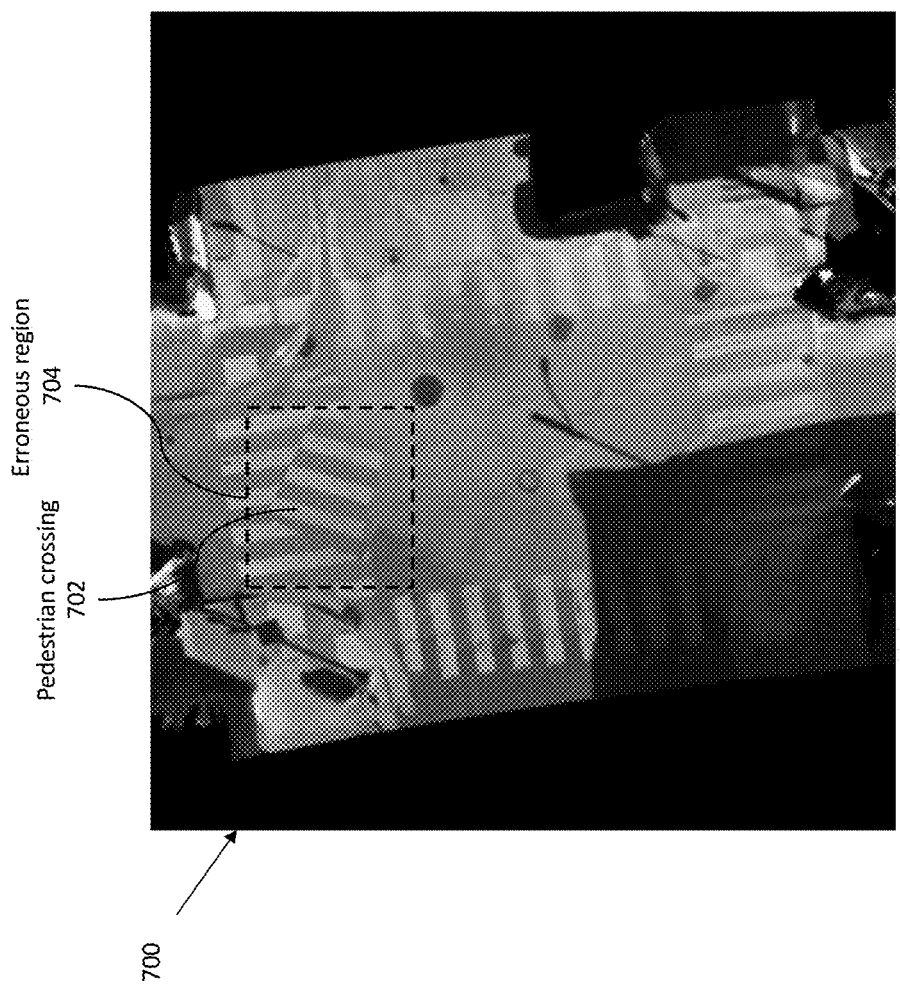
FIG. 7 shows a generated overhead view image that includes an erroneous region in a pedestrian crossing.

FIG. 7 shows one possible example of an aggregated overhead view image 700 that may be generated by a pipeline for generating overhead view images. In FIG. 7, an overhead view generation arrangement has been used to create the aggregated overhead view image 700 from camera images, and as shown, the aggregated overhead view image 700 comprises an erroneous region 704. The erroneous region 704 may have arisen due to an issue with some aspect of the parameters used by one or more aspects of the pipeline during generation of aggregated overhead view image 700 (e.g., an issue with one or more parameters related to capture of sensor data, calibration and/or synchronization of sensor units, generation of SLAM information, and/or processing of captured sensor data). In the figure, the error is exaggerated for purpose of illustration. One or more regions, such as the erroneous region 704, can be selected on the aggregated overhead view image around which to optimize parameters. One or more of the one or more regions may be specified as a latitude and longitude, or range of latitudes and longitudes. When the aggregated overhead view image 700 was recreated from the camera images from a vehicle (or multiple vehicles), in this example one or more errors were introduced that led to erroneous region 704. Such errors may be apparent to a human user, for example, the conventionally straight parallel lines of a pedestrian crossing 702 are abruptly contorted into a different shape. Other errors may be more subtle, but still relevant, for example, when considered for the use of automated driving.

In some embodiments, an image quality metric may be used to determine if the overhead view image or one or more regions of the overhead view image include one or more erroneous regions. The image quality metric can be used to assess the quality of a portion of or a whole image based on subjective (human-based) or objective (computer-based) methods to predict or determine the image quality of an overhead view image based on properties of the overhead view image. The image quality metric can be used to determine whether the region of the overhead view image should be assessed against one or more source images in order to increase its image quality. The image quality metric can also be used to suggest the erroneous areas of the overhead view image, for example. However, in other embodiments, the overhead view image may be assessed against one or more source images regardless of its indicated image quality.

When an error is introduced into an aggregated overhead view image, the aggregated overhead view image can be reprojected (or re-created) as one or more reprojected images with substantially the same poses as one or more source images (which may also be referred to as "input camera images") that were used to generated the overhead view image, which may enable comparison between the one or more reprojected images and the one or more source images. In this respect, in some embodiments, an image quality metric could be used in a similar manner to that described above to evaluate whether a reprojected image should be assessed against a source image, while in other embodiments a reprojected image may be assessed against a source image regardless of its indicated image quality.

FIG. 8 shows an example image data capture system 810. A vehicle 822 is provided with a camera 824. The camera 824 has a field of view 826 and captures an image 816 of that field of view 826, including image data of a portion of the ground 820 over which it travels. In the image 816, image data 814 of a sampling point 812 on the ground 820 is captured, and the position of the sampling point 812 on the ground 820, and therefore in the environment being mapped, can be determined using the camera ray line 818 between the camera 824 and the image portions 814 (and by extension sampling point 812). Once a generated overview image 852 is created, a simulation of the camera 854 and the field of view 856 of the simulated camera 854 can be calculated using the aggregated overhead view image 852. Here, the sampling point 860 in the real world can be reprojected from the relevant patch of the aggregated overhead view image 852 using a calculation of the field of view 856 of the simulated camera to determine the image 858 of the portions of the aggregated overhead view image 852 visible to the simulated camera 854. This process is called reprojection of an image 850.

Figure 9:
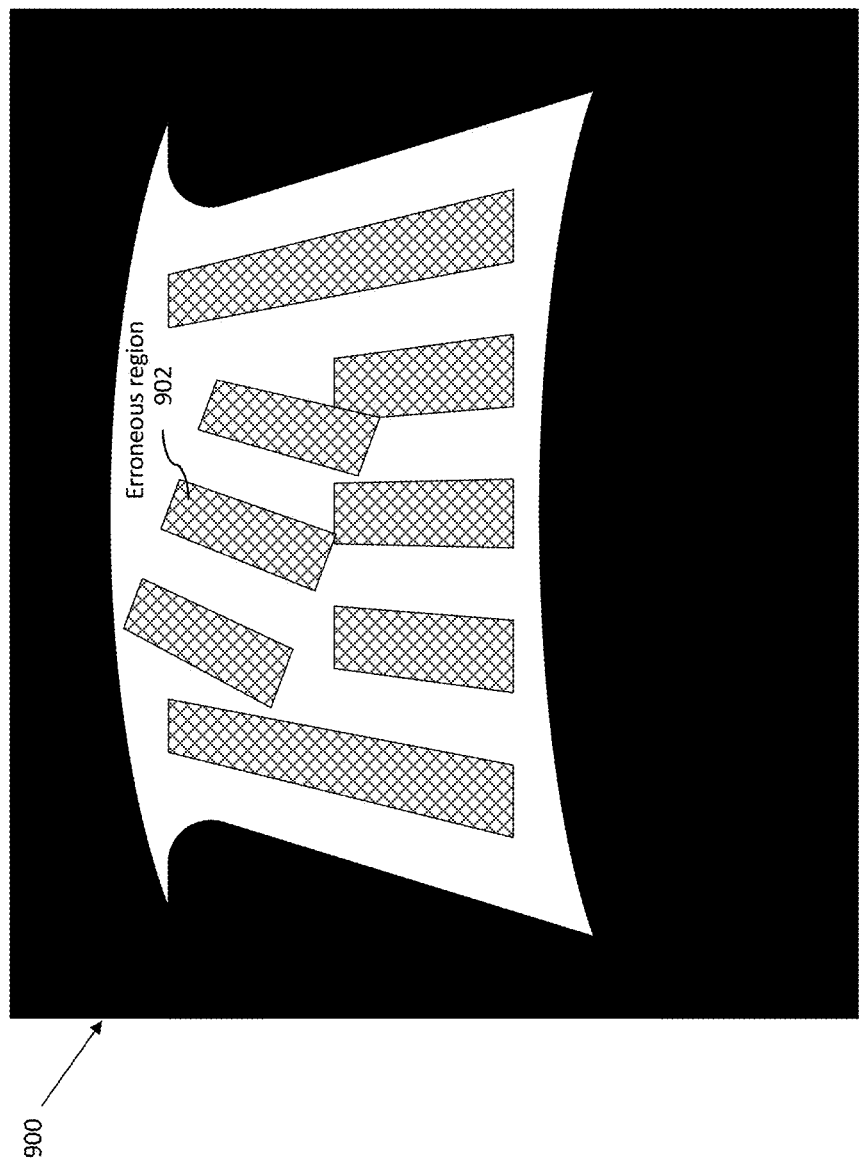

FIG. 9 shows an illustration of a reprojected view image 900, otherwise known as a back-projected view image, that has been recreated from the overhead view image and which comprises an erroneous region 902. The reprojected view image 900 thus simulates at least one of the source camera images used to create the erroneous region 704 in the aggregated overhead view image 700.

In example embodiments, reprojection or back-projection can be carried out by, for example, projecting pixel values of the overhead view image onto the correct corresponding pixels in the field of view image obtained by the traversing vehicles and adding the overhead view image values to the existing values of the field of view image. In some embodiments however, reconstruction of reprojected view images from overhead view images can be processed using a filtered back projection approach, an iterative approach, or Fourier reconstruction approach as such approaches would be understood by a skilled person in the art. In some embodiments, in order to correct resolution problems which may occur in a reprojected field of view image from an overhead view image, a method of interpolation can be added, for example, to fill gaps visible in resolution.

Figure 10:
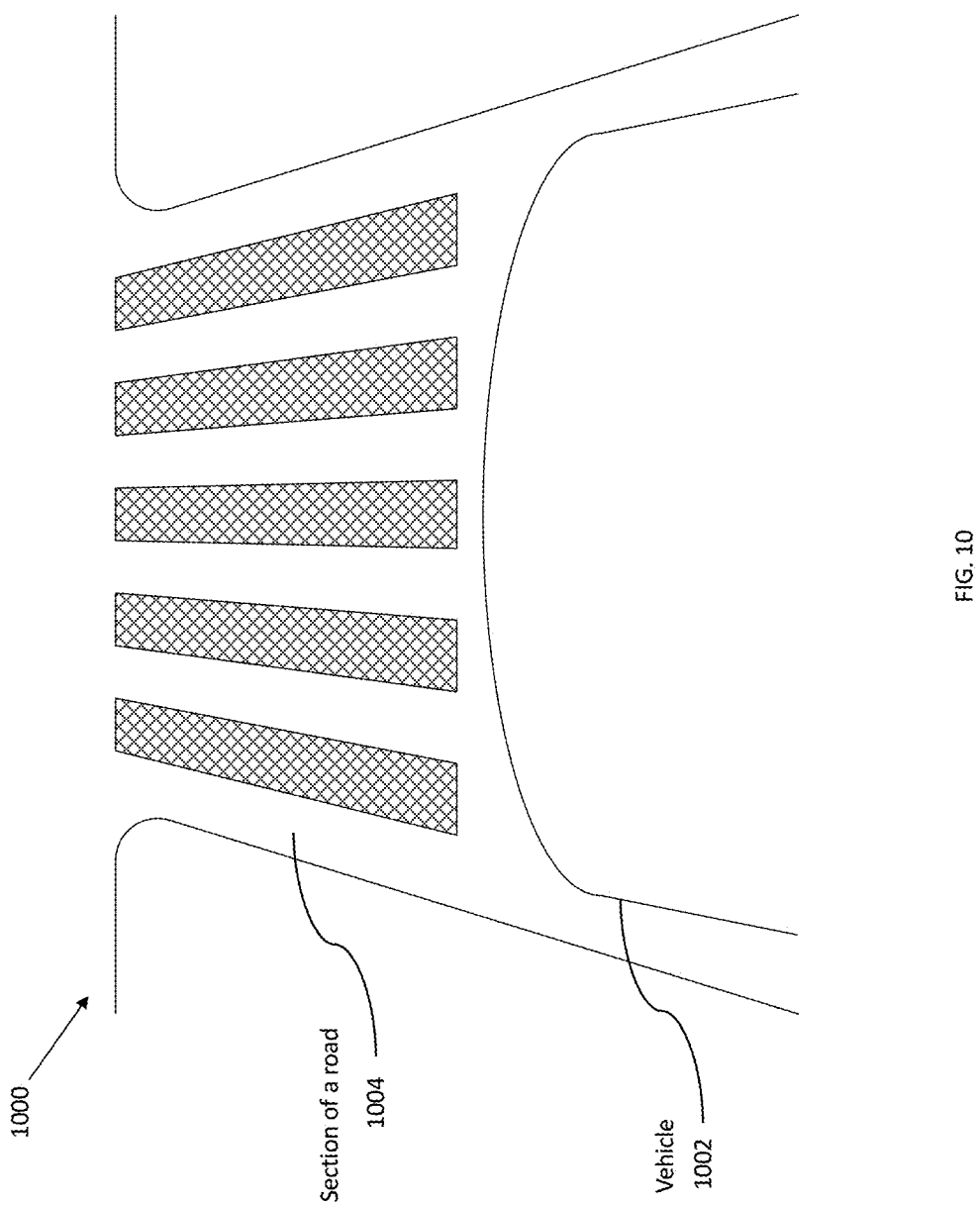
FIG. 10 shows an illustration of an original camera image taken from a vehicle having the same pose as the reprojected view image of FIG. 9.

FIG. 10 shows an illustration of one source camera image 1000 taken from a vehicle 1002, corresponding to the same field of view as the simulated reprojected view image 900. The source camera image 1000 taken from the vehicle 1002 captures a real-world view of a section of a road 1004 that is of interest for evaluating the errors in the overhead view image 700. This camera image 1000 should be free from any errors caused during the imperfect generation of the overhead view image 700.

Figure 11:
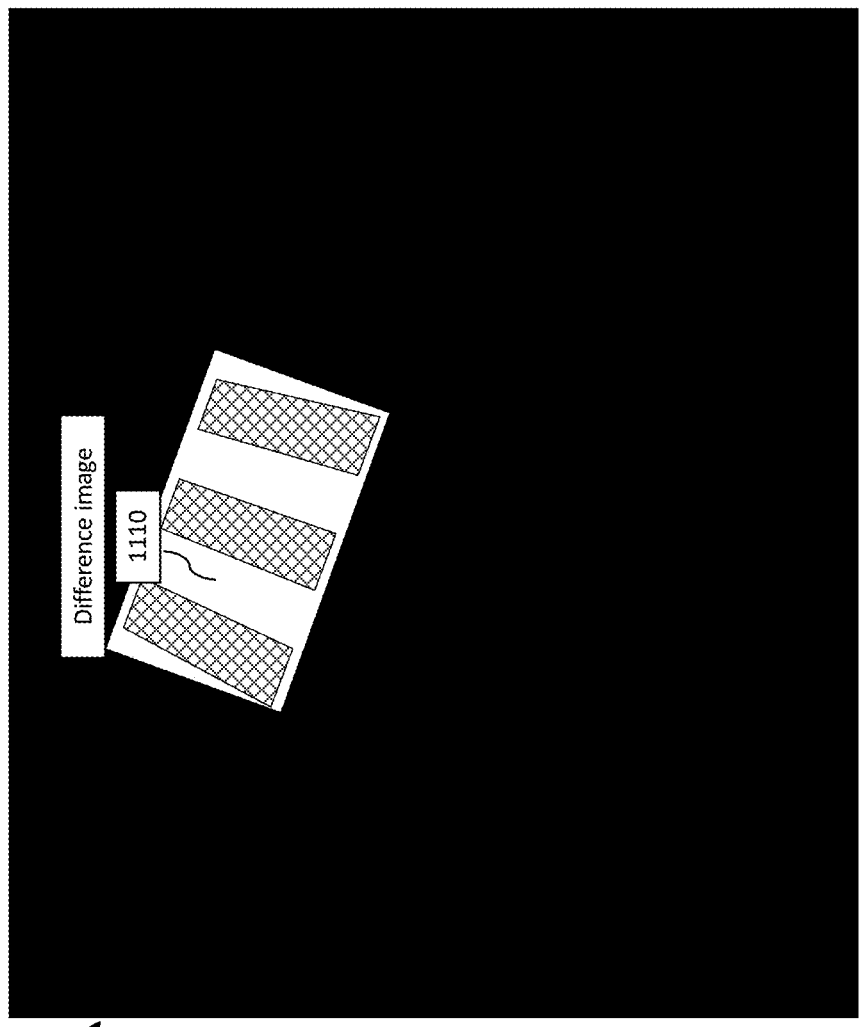
FIG. 11 shows an illustration of a difference image between the reprojected view image and the original camera image of FIGS. 9 and 10 respectively.

As shown by the output of the process 1100 in FIG. 11, the source camera image 1000 is then compared with the corresponding reprojected view image 900. Any differences between the source camera image and the corresponding reprojected view image are isolated into a difference image 1110. The process of computing the difference image 1110 may be performed using one or more of a number of different methods, for example, through an analysis of a color space: RGB, XYZ, HSV, and/or gray scale. Specifically, the difference image 1110 is generated by determining which of the pixels of the reprojected view image do not match the source camera image, then isolating from the source camera image only the pixels of the camera image that would replace the incorrect pixels in the reprojected view image. An analysis of the color space of images for example can be implemented for substantially shadow-free reconstructions of images. Color features can improve the performance of object or artefact tracking in images under various lighting conditions such as shadows that may be often evident in images obtained by vehicles and thus can be useful for shadow detection and shadow removal. Alternatively, or additionally, a distance function may be used, such as squared distance and/or Manhattan distance.

Once the difference image is created, a reprojection error may then be computed between the source camera image 1000 and the simulated reprojected view image 900. The process of reprojection error computation may comprise computing a single difference image between source camera image 1000 and the simulated reprojected view image 900 or computing multiple difference images. The difference values per portion of the aggregated overhead view image may then be determined from one difference image or summed across multiple difference images to compute a single reprojection error per portion of the aggregated overhead view image. The following portions of the aggregated overhead view image may be excluded from the error sum: portions that are masked out by a segmentation mask (for example to ensure a computation focused on a road surface only); and/or portions that are masked out by camera masks for each camera. Camera masks, for example, can be used to apply a segmentation mask on cameras either collectively or individually in order to segment or exclude areas of an image obtained within the field of view of the camera, for example, an obstruction to the ground such as body panels of a vehicle 1002.

Computing reprojected camera views can be computationally expensive, as rays from a camera origin through every region can be intersected with a ground map. To reduce the computational expense and hence speed up the process, reprojected pixels may only be considered in a restricted area (for example, 5×5 pixels) around the edges of the original camera image 1000 only.

Once the reprojection error is computed for the original overhead view image 700 in the manner described above with reference to FIGS. 8-11, an optimization process (e.g., Ceres solver) may then be carried out in order to identify a particular set of parameters employed by the pipeline for generating overhead view images that, when used to re-generate the overhead view image 700, would minimize the reprojection error relative to the source images. In this respect, the optimization process may involve iteratively (i) modifying some aspect of the parameters employed by the pipeline for generating overhead view images, (ii) re-generating the overhead view image using the modified parameters, (iii) re-calculating the reprojection error for the re-generated overhead view image in the manner described above with reference to FIGS. 8-11, and (iv) comparing the reprojection error calculated for the re-generated overhead view image to the reprojection error calculated during other iterations in order to determine whether this modified version of the meters employed by the pipeline for generating overhead view images is a candidate for minimizing the reprojection error relative to the source images. Once this iterative optimization process is completed and a modified set of parameters that minimize the reprojection error has been determined, the differences between this modified set of parameters and the original set of parameters that were being utilized by the pipeline for generating overhead view images may then be used as a basis for defining one or more error corrections to be applied to the parameters utilized by the pipeline for generating overhead view images.

Figure 12:
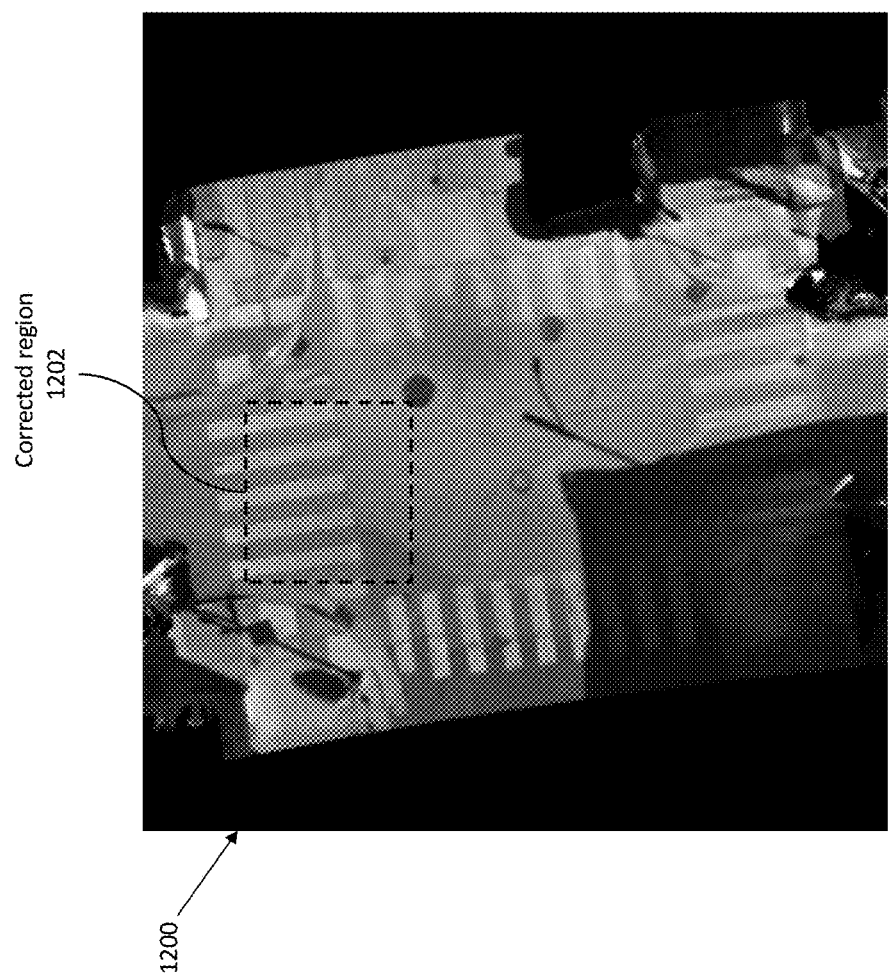
FIG. 12 shows a corrected generated overhead view image of FIG. 7.

After these one or more error corrections are applied to the parameters utilized by the pipeline for generating overhead view images, that pipeline may then be capable of generating higher-quality overhead view images going forward. For instance, the updated pipeline could be used to re-generate the overhead view image 700 of FIG. 7, and one example of this re-generated version of the overhead view image 700 is depicted in FIG. 12 as re-generated aggregated overhead view image 1200. As shown, the re-generated aggregated overhead view image 1200 may more accurately represent certain aspects of a real-world environment, such as a junction between a collection of roads. For example, the erroneous region 704 has been replaced with a corrected region 1202, such that if an aerial photograph were taken of the region in question, it would more closely resemble the re-generated aggregated overhead view image 1200 than the erroneous aggregated overhead view image 700.

Another possible example of the workflow for calculating a reprojection error for a given iteration of an overhead view image generated by a pipeline for generating overhead view images will now be described with reference to FIGS. 13-15. For instance, FIG. 13 shows another example of creating a reprojected image 1302 from an aggregated overhead view image 1301. The aggregated overhead view image 1301 is shown having a region 1305 that indicates the overhead image region within the field of view of a simulated camera 1307 at a position within the environment of the reprojected image 1302. Using the aggregated overhead view image 1301 and the calculated field of view region 1305, a reprojected image 1302 can be determined showing the visible ground 1310 for the simulated camera 1307 once segmentation masks are applied to mimic the segmentation masks applied to images collected of the real-world environment. Once a generated overview image 1301 is generated, a simulation of the camera 1307 and the field of view of the overhead view region 1305 of the simulated camera 1307 at the simulated camera position can be calculated using the aggregated overhead view image 1301. Here, the sample points in the real world can be reprojected from the relevant patch of the aggregated overhead view image 1301 (i.e. of the field of view overhead view region 1305 of the simulated camera 1307) to determine a reprojection image of the aggregated overhead view image 1301 visible to the simulated camera 1307.

FIG. 14 shows a comparison between the reprojected image 1302, as determined in FIG. 13, having a simulated ground image 1310, and an original equivalent image 1401 as it was actually captured in the environment. More specifically, FIG. 14 shows an illustration of one camera image 1401 taken from a vehicle, corresponding to the simulated reprojected view image 1301. In FIG. 14, the original equivalent image 1401 shows the actual ground image 1405 as it was captured from the field of view from the actual camera. The camera image 1401 taken from the vehicle captures a real-world view of a section of an environment that is of interest for correction of any errors in the overhead view image 1301, for example. This camera image 1401 is free from any errors caused during the computation of generation of the overhead view image 1301. As shown in FIG. 14, the camera image 1401 is compared with the corresponding reprojected view image 1302 and any differences between the camera image 1401, and the corresponding reprojected view image 1302 are isolated into a difference image as shown as 1500 in FIG. 15.

FIG. 15 shows the difference image 1500 created to show the reprojected image difference 1505 between the actual ground image 1405 of the original equivalent image 1401 and the simulated ground image 1310 of the reprojected image 1302 once typical segmentation masks have been applied to the original equivalent image 1401 to match it to the segmented reprojected image. One or more of the differences calculated when the difference image 1500 is created may be considered as the error which has been introduced into the aggregated overhead view image 1301. Such errors may be due to an issue with some aspect of the parameters used by the pipeline during generation of overhead view image 1301 (e.g., an issue with one or more parameters related to capture of sensor data, calibration and/or synchronization of sensor units, generation of SLAM information, and/or processing of captured sensor data).

Once the difference image 1500 has been created, that difference image 1500 can be used to calculate a reprojection error between the actual ground image 1405 of the original equivalent image 1401 and the simulated ground image 1310 of the reprojected image 1302. In turn, that reprojection error may be used to determine whether an optimization process should be run for the parameters utilized by the pipeline for generating overview view images. For instance, if the reprojection error calculated in the manner described with reference to FIGS. 13-15 is sufficiently low, it may be determined that it is unnecessary to run an optimization process for the parameters utilized by the pipeline for generating overview view images at this time. On the other hand, if the reprojection error calculated in the manner described with reference to FIGS. 13-15 meets or exceeds a threshold, it may be determined that an optimization process should be run for the parameters utilized by the pipeline for generating overview view images.

To the extent it is determined that an optimization process should be run, then in line with the discussion above, that optimization process may then be carried out in order to identify a particular set of parameters employed by the pipeline for generating overhead view images that, when used to re-generate the overhead view image 1301, would minimize the reprojection error relative to the source images (e.g., original equivalent image 1401). Once this iterative optimization process is completed and a modified set of parameters that minimize the reprojection error has been determined, the differences between this modified set of parameters and the original set of parameters that were being utilized by the pipeline for generating overhead view images may then be used as a basis for defining one or more error corrections to be applied to the parameters utilized by the pipeline for generating overhead view images. After these one or more error corrections are applied to the parameters utilized by the pipeline for generating overhead view images, that pipeline may then be capable of generating higher-quality overhead view images going forward. For instance, the updated pipeline may be used to produce a re-generated version of overhead view image 1301 and/or may be used to generate overhead view images for various other geographic areas.

In addition to using the difference image 1500 to help determine the one or more error corrections that should be applied to the pipeline for generating overhead view images, that difference image 1500 could also be used for other purposes. For example, it may be possible to use the difference image 1500 to perform a targeted correction of the aggregated overhead view image 1301, by identifying the regions of the aggregated overhead view that coordinate with the pixels of the difference image 1500 and applying the difference indicated by the respective pixel of the difference image to the respective regions of the aggregated overhead view.

Figure 16:
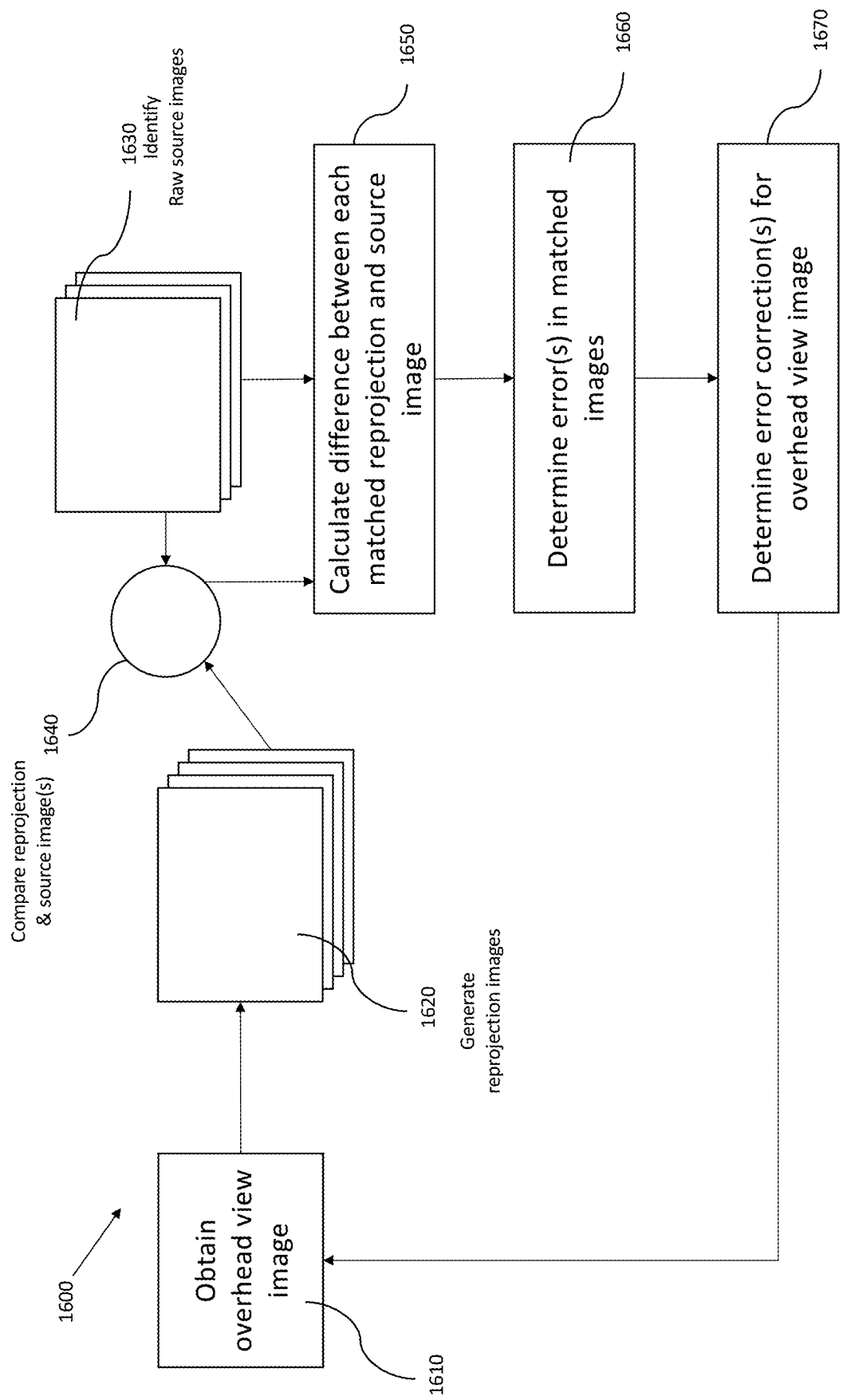
FIG. 16 shows one possible implementation of a reprojection error correction process 1600 that may be carried out in accordance with the present disclosure for determining error correction(s) to be applied to a pipeline for generating overhead view images.

FIG. 16 shows one possible implementation of a process 1600 that may be carried out in accordance with the present disclosure for determining error correction(s) to be applied to a pipeline for generating overhead view images. As shown, this process 1600 may begin at block 1610 by obtaining an aggregated overhead view image that was generated by the pipeline for generating overhead view images. In turn, one or more reprojection images for that aggregated overhead view image are generated at block 1620, one or more raw source images that match the one or more reprojection images are identified at block 1630, and the one or more reprojection images are compared to the matching one or more raw source images at block 1640. Based on comparing each generated reprojection image with a matching source image, at block 1650, the process 1600 can be used to calculate differences between each pair of matched reprojection and source images, and at block 1660, the process 1600 can determine a reproduction error for each pair of matched reprojection and source images. Lastly, based on the determined reproduction error(s), the process 1600 may decide at block 1670 to commence a process for determining error correction(s) to be applied to the pipeline for generating aggregated overhead view images, which as noted above may involve iterative optimization process for identifying a modified set of parameters employed by the pipeline that, when used to re-generate the aggregated overhead view image, would minimize the reprojection error relative to the source image(s).

For instance, the process for determining error correction(s) to be applied to the pipeline for generating overhead view images may involve the use of an optimization process (e.g., a Ceres solver) that functions to iteratively (i) modify some aspect of the parameters employed by the pipeline for generating overhead view images, (ii) re-generate the overhead view image using the modified parameters, (iii) re-calculate the reprojection error for the re-generated overhead view image in the manner described above with reference to blocks 1620-1660, and (iv) compare the reprojection error calculated for the re-generated overhead view image to the reprojection error calculated during other iterations in order to determine whether this modified version of the meters employed by the pipeline for generating overhead view images is a candidate for minimizing the reprojection error relative to the source images. Once this iterative optimization process is completed and a modified set of parameters that minimize the reprojection error has been determined, the differences between this modified set of parameters and the original set of parameters that were being utilized by the pipeline for generating overhead view images may then be used as a basis for defining the one or more error corrections to be applied to the parameters utilized by the pipeline for generating overhead view images. In this way, the disclosed process may enable a pipeline to generate higher-quality overhead view images going forward.

Figure 17:
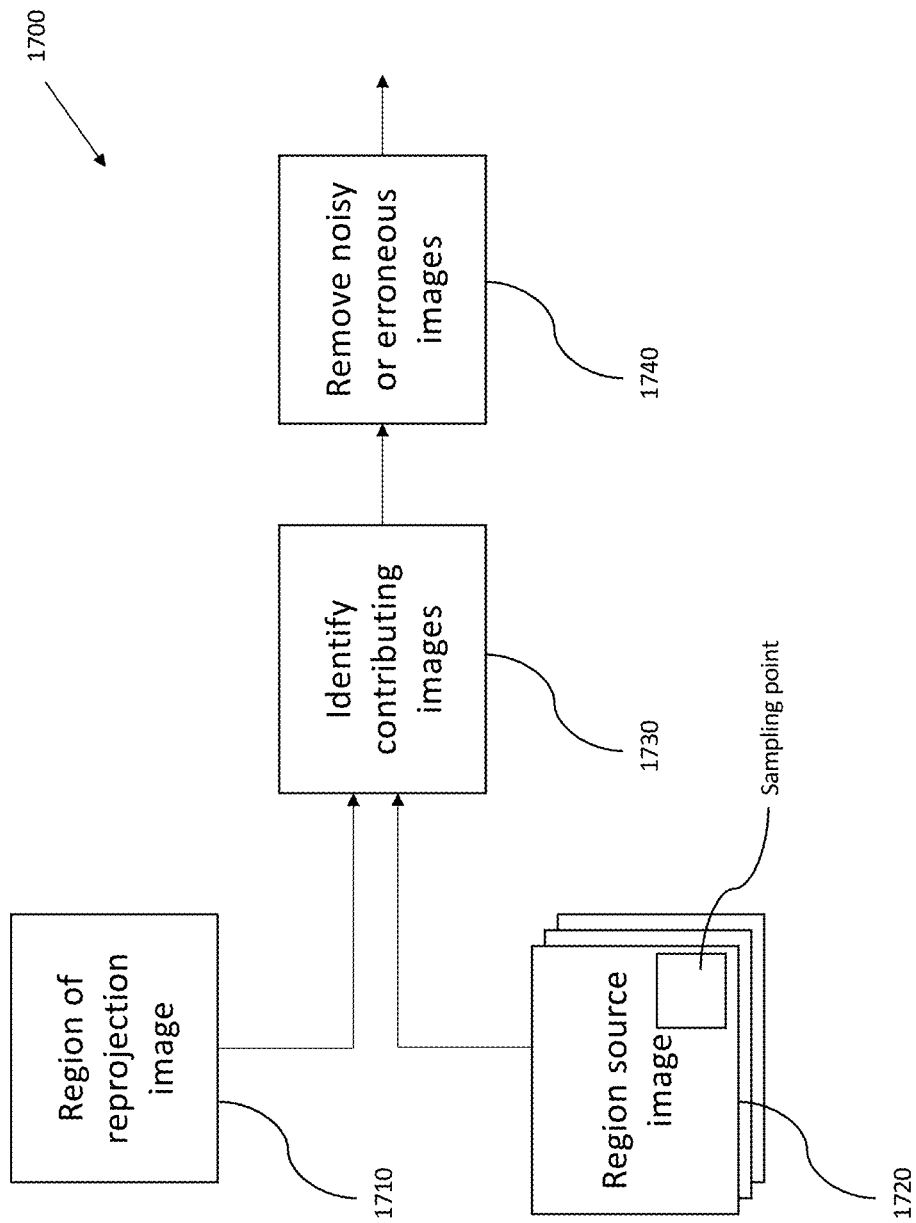
FIG. 17 shows one possible example of a process 1700 that may be carried out in accordance with the present disclosure in order to perform the function of identifying one or more matching source images.

FIG. 17 shows one possible example of a process 1700 that may be carried out in accordance with the present disclosure in order to perform the function of identifying one or more matching source images (e.g., as described above at block 1630). As shown, process 1700 may begin at block 1710 by identifying a region (or sampling point) of a reprojected image (e.g., one of the reprojected images generated at block 1620). In turn, at block 1720, source images can be evaluated to determine whether such source images capture a region (or sampling point) for comparison with the identified region (or sampling point) of the reprojected image, where both images have a substantially identical field of view. As a result of this evaluating function, at block 1730, a set of source images that capture the identified region (or sampling point) of the reprojected image may be identified. This identified set of source images may be referred to as "contributing images" as these images may contribute to the output of a finer quality overhead image. Further, in an example, the identified set of contributing images may optionally include only images which capture the region within a given maximum or threshold distance from the camera. At block 1740, the process 1700 may also optionally remove images from the set of contributing images that cause noise to or that are erroneous in generating overhead view images due to deficiencies within the contributing images. The set of contributing images output by this process 1700 may then be compared to the reprojection image in the manner described above.

As with any large dataset there will undoubtedly be a percentage of broken, corrupt or erroneous data. Therefore, in some embodiments new data that corresponds to an area, or a new map segment, needs to be tested before incorporating or updating parts of a global map. In some embodiments, the new data is only incorporated in the global map if it satisfies a predetermined quality threshold for example. If very large amounts of data are gathered, the predetermined quality threshold can be relatively high. The predetermined quality threshold may be based on accuracy and precision-based criteria with respect to the global map. For example, new data may only be incorporated into the global map if it aligns with the coordinate system of the global map or if the image is sufficiently clear for the system to render and may be rejected in, for example, the new data comprises images with substantially obstructed field of views.

In some embodiments, an overhead view image of the global ground map can be very large, and therefore, it may not be possible for it to be stored as a single image file. In order to support large areas that might not fit into one single image, the generated overhead view image can be divided into smaller images by sub regions or small sections for more efficient data storage and processing.

In some embodiments, a vehicle used may obtain and process sensor/telemetry data. Such data may be captured by any suitable sensors. For example, the vehicle may have a LiDAR sensor array of multiple LiDAR transceivers that are configured to rotate 360°, emitting pulsed laser light and measuring the reflected light from objects surrounding vehicle. In some embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional model of the external environment of the vehicle. As an example, and not by way of limitation, the three-dimensional model may represent the external environment including objects such as other cars, curbs, debris, objects, and pedestrians up to a maximum range of the sensor arrangement (e.g., 50, 100, or 200 meters).

As another example, the vehicle may have optical cameras pointing in different directions. The cameras may be used for, e.g., recognizing roads, lane markings, street signs, traffic lights, police, other vehicles, and any other visible objects of interest. To enable the vehicle to "see" at night, infrared cameras may be installed. In some embodiments, the vehicle may be equipped with stereo vision for, e.g., spotting hazards such as pedestrians or tree branches on the road. As another example, the vehicle may have radars for, e.g., detecting other vehicles and hazards afar. Furthermore, the vehicle may have ultrasound equipment for, e.g., parking and obstacle detection. In addition to sensors enabling the vehicle to detect, measure, and understand the external world around it, the vehicle may further be equipped with sensors for detecting and self-diagnosing the vehicle's own state and condition. For example, the vehicle may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples.

Further, while an example of a utility may be described with respect to a particular type of sensor, it should be appreciated that the utility may be achieved using any combination of sensors. For example, the vehicle may build a three-dimensional model of its surrounding based on data from its LiDAR, radar, sonar, and cameras, along with a pre-generated map obtained from a transportation management system or third-party system. Although sensors appear in a particular location on the vehicle in FIGS. 2A-B, sensors may be located in any suitable location in or on the vehicle. Example locations for sensors include the front and rear bumpers, the doors, the front windshield, on the side panel, or any other suitable location.

In particular embodiments, the vehicle may be equipped with a processing unit (e.g., one or more CPUs and GPUs), memory, and storage. The vehicle may thus be equipped to perform a variety of computational and processing tasks, including processing the sensor data, extracting useful information, and operating accordingly. For example, based on images captured by its cameras and a machine-vision model, the vehicle may identify particular types of objects captured by the images, such as pedestrians, other vehicles, lanes, curbs, and any other objects of interest.

A map, as described in example embodiments, is a depiction of a whole area or a part of an area which emphasizes the relationships between elements in space such as objects, landmarks, road signs, road names, or location. In some embodiments, a road map may display transport links and include points of interest, such as prominent buildings, tourism sites, recreational facilities, and airports. In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimized global map or section of the map. The term global map can be used to refer to a large-scale map which is built by combining a number of smaller maps or map segments.

Image data, as described in example embodiments, obtained for processing by at least one image sensor (e.g., an image sensor attached to a vehicle), in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression.

Figure 18:
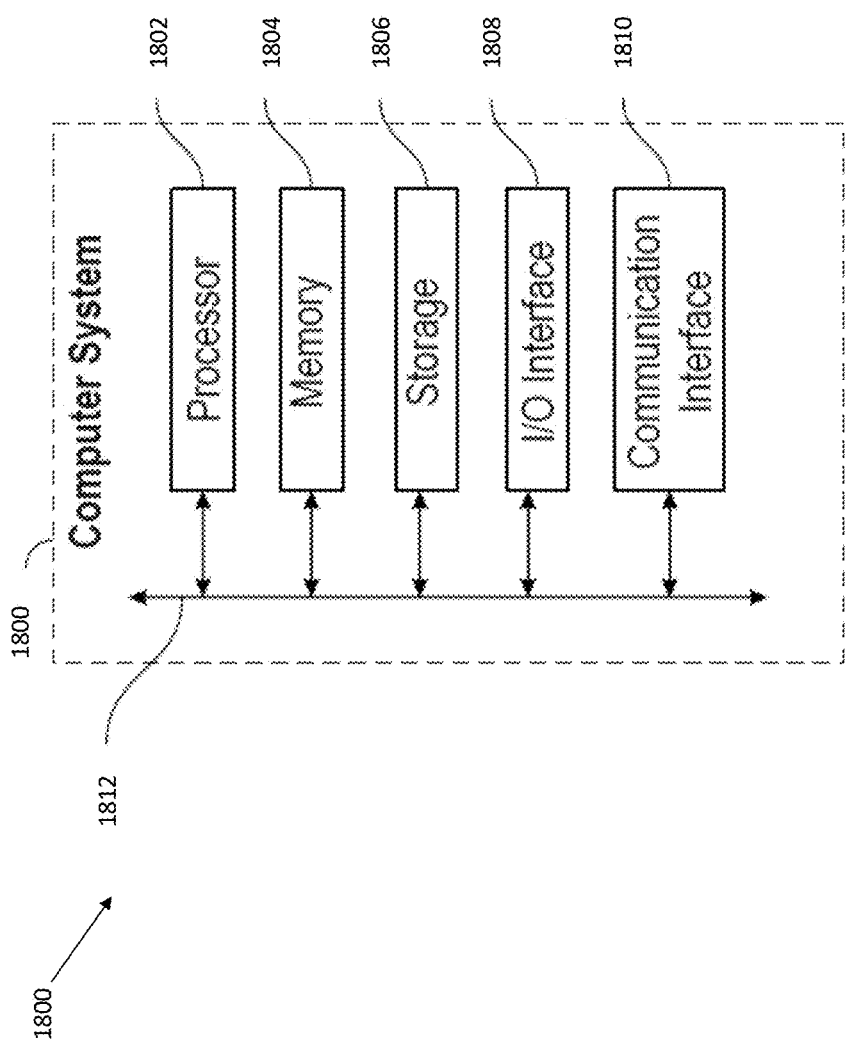
FIG. 18 illustrates an example of a computer system or computing device that can be utilized in at least one of the described embodiments.

FIG. 18 illustrates an example computer system 1800, which may be configured to perform the functions of one or more methods described or illustrated herein either alone or in combination with one or more other computer systems (which may take a similar form to computer system 1800). In particular embodiments, software running on computer system 1800 may enable computer system 1800 to perform one or more functions of the one or more methods described or illustrated herein. Herein, a reference to a computer system may encompass a computing device, and vice versa, where appropriate. Moreover, a reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform one or more functions of one or more methods described or illustrated herein without substantial spatial or temporal limitation. As an example, and not by way of limitation, one or more computer systems 1800 may perform in real time or in batch mode one or more functions of one or more methods described or illustrated herein. One or more computer systems 1800 may perform one or more functions of one or more methods described or illustrated herein at different times or at different locations, where appropriate.

In particular embodiments, computer system 1800 includes at least one processor 1802, non-transitory computer readable media such as memory 1804 and storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing program instructions for causing computer system 1800 to carry out one or more functions of one or more methods described or illustrated herein. As an example, and not by way of limitation, to execute program instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example, and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 that are to be operated on by computer instructions; the results of previous instructions executed by processor 1802 that are accessible to subsequent instructions or for writing to memory 1804 or storage 1806; or any other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs), be a multi-core processor, or may include multiple processing units. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example, and not by way of limitation, computer system 1800 may load instructions from storage 1806 or another source (such as another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described in further detail below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may also include multiple memory units, where appropriate. Although this disclosure describes and illustrates particular memory, this disclosure contemplates any suitable memory.

In particular embodiments, storage 1806 includes storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include also include multiple storage units. Although this disclosure describes and illustrates particular storage, this disclosure contemplates any suitable storage.

In particular embodiments, I/O interface 1808 includes hardware or software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may also include multiple I/O interface units, where appropriate. Although this disclosure describes and illustrates a particular I/O interface, this disclosure contemplates any suitable I/O interface.

In particular embodiments, communication interface 1810 includes hardware or software, or both providing one or more interfaces for communication (such as, for example, packet-based communication) between computer system 1800 and one or more other computer systems (or other network devices) via one or more networks. As an example, and not by way of limitation, communication interface 1810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1800 may include any suitable communication interface 1810 for any of these networks, where appropriate. Communication interface 1810 may include also include multiple communication interface units, where appropriate. Although this disclosure describes and illustrates a particular communication interface, this disclosure contemplates any suitable communication interface.

In particular embodiments, bus 1812 includes hardware or software, or both coupling components of computer system 1800 to each other. As an example and not by way of limitation, bus 1812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may also include multiple bus units, where appropriate. Although this disclosure describes and illustrates a particular bus, this disclosure contemplates any suitable bus or interconnect.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Many variations to the example method are possible. It should be appreciated that there can be additional, fewer, or alternative steps performed in similar or alternative orders, or in parallel, within the scope of the various embodiments discussed herein unless otherwise stated.

Any system features as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:

1. A method comprising:
   obtaining an aggregated image of a geographical area that has been generated by a pipeline as an overhead view wherein the aggregated image is generated from aggregating pixel values from source images of the geographical area including a plurality of regions;
   generating, from the aggregated image, one or more reprojection images of one or more of the regions;
   calculating a difference between the source images of the geographical area and the one or more reprojection images; and
   determining, according to the difference, one or more error corrections to be applied to the pipeline for generating overhead view images, including:
   performing an iterative optimization process to identify correction parameters that minimize a reprojection error when utilized by the pipeline;
   identifying a parameter difference between original parameters used by the pipeline and the correction parameters; and
   using the parameter difference to derive the error corrections.

2. The method as recited in claim 1, wherein the source images from which the aggregated image is generated comprises one or more source images captured at a substantially ground-level view.

3. The method as recited in claim 1, wherein the one or more reprojection images are generated at a substantially ground-level view.

4. The method as recited in claim 1, wherein calculating one or more differences comprises an analysis of one or more of: color space and a distance function.

5. The method as recited in claim 1, wherein the error corrections comprise one or more modifications to one or more parameters utilized by the pipeline to generate one or more of the aggregated image.

6. The method as recited in claim 1, wherein the error corrections comprise a modification to (i) one or more parameters related to capture of image data utilized by the pipeline to generate aggregated overhead view images, (ii) one or more parameters related to capture of point cloud data utilized by the pipeline to generate aggregated overhead view images, (iii) one or more parameters related to calibration or synchronization of sensor units utilized by the pipeline to generate aggregated overhead view images, (iv) one or more parameters related to the generation of simultaneous localization and mapping (SLAM) information utilized by the pipeline to generate aggregated overhead view images, and (v) one or more parameters related to one or more processing techniques utilized by the pipeline to generate aggregated overhead view images.

7. The method as recited in claim 6, wherein the one or more processing techniques utilized by the pipeline to generate the aggregated image comprises a segmentation technique.

8. The method as recited in claim 1, wherein identifying the source images comprise one or more of: (i) filtering out one or more of the source images taken at a distance greater than a predetermined distance; (ii) filtering out a portion of one or more of the source images including over a predetermined amount of shadow; (iii) filtering out one or more of the source images below a predetermined quality threshold; (iv) filtering out one or more of the source images taken within a predetermined time window; (v) filtering out one or more of the source images taken from a given camera; and (vi) filtering out pixels that are masked out by one or more segmentation masks.

9. The method as recited in claim 8, wherein the one or more segmentation masks comprises a mask corresponding to one or both of a road surface or a vehicle mask.

10. The method as recited in claim 1, wherein calculating the difference between the source images and the reprojection images comprises:
    summing difference values per pixel; and
    outputting one or more error metrics.

11. The method as recited in claim 10, wherein calculating the difference includes considering pixels in a predetermined limit around edges of the source images, and wherein the predetermined limit comprises a predetermined size of a pixel grid.

12. The method as recited in claim 1, further comprising:
    determining an image quality metric per pixel with respect to the aggregated image.

13. The method as recited in claim 12, wherein generating the one or more reprojection images occurs according to the image quality metric.

14. A non-transitory computer-readable medium comprising program instructions stored thereon that are executable by at least one processor such that a computing system is capable of:
    obtaining an aggregated overhead view image of a geographical area that has been generated by a pipeline, the geographical area comprising a plurality of regions, wherein the aggregated overhead view image is generated from aggregating pixel values from a plurality of source images of the geographical area;
    generating one or more reprojection images of one or more of the regions of the geographic area from the aggregated overhead view image;
    calculating a difference between the source images of the geographical area and the one or more reprojection images; and
    determining, according to the difference, error corrections to be applied to the pipeline for generating overhead view images, including:
    performing an iterative optimization process to identify correction parameters that minimize a reprojection error when utilized by the pipeline;
    identifying a parameter difference between original parameters used by the pipeline and the correction parameters; and
    using the parameter difference to derive the error corrections.

15. The computer-readable medium of claim 14, wherein the one or more error corrections comprise a modification to (i) one or more parameters related to capture of image data utilized by the pipeline to generate aggregated overhead view images, (ii) one or more parameters related to capture of point cloud data utilized by the pipeline to generate aggregated overhead view images, (iii) one or more parameters related to calibration or synchronization of sensor units utilized by the pipeline to generate aggregated overhead view images, (iv) one or more parameters related to the generation of simultaneous localization and mapping (SLAM) information utilized by the pipeline to generate aggregated overhead view images, (v) one or more parameters related to one or more processing techniques utilized by the pipeline to generate aggregated overhead view images.

16. The computer-readable medium of claim 14, wherein the one or more processing techniques utilized by the pipeline to generate aggregated overhead view images comprises a segmentation technique.

17. A computing system comprising:
   at least one processor;
   a non-transitory computer-readable medium; and
   program instructions stored on the non-transitory computer-readable medium that are executable by the at least one processor such that the computing system is capable of:
      obtaining an aggregated overhead view image of a geographical area that has been generated by a pipeline, the geographical area comprising a plurality of regions, wherein the aggregated overhead view image is generated from aggregating pixel values from a plurality of source images of the geographical area;
      generating one or more reprojection images of one or more of the regions of the geographic area from the aggregated overhead view image;
      calculating a difference between the source images and the one or more reprojection images; and
      determining, according to the difference, one or more error corrections to be applied to the pipeline for generating overhead view images, including:
         performing an iterative optimization process to identify correction parameters that minimize a reprojection error when utilized by the pipeline;
         identifying a parameter difference between original parameters used by the pipeline and the correction parameters; and
         using the parameter difference to derive the error corrections.

\* \* \* \* \*